US008172665B2

(12) United States Patent
Hoffman et al.

(10) Patent No.: US 8,172,665 B2
(45) Date of Patent: May 8, 2012

(54) GAMING SYSTEM ENABLING A SYMBOL DRIVEN WIN EVALUATION METHOD

(75) Inventors: Benjamin C. Hoffman, Reno, NV (US); Paulina Rodgers, Reno, NV (US); Christmas C. Parker, Reno, NV (US)

(73) Assignee: IGT, Reno, NC (US)

( * ) Notice: Subject to any disclaimer, the term of this patent is extended or adjusted under 35 U.S.C. 154(b) by 753 days.

(21) Appl. No.: 12/269,229

(22) Filed: Nov. 12, 2008

(65) Prior Publication Data

US 2010/0120496 A1 May 13, 2010

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................... 463/20; 463/21

(58) Field of Classification Search ............... 463/20–21
See application file for complete search history.

(56) References Cited

U.S. PATENT DOCUMENTS

| | | | |
|---|---|---|---|
| 4,157,829 | A | 6/1979 | Goldman et al. |
| 4,198,052 | A | 4/1980 | Gauselmann |
| 4,335,809 | A | 6/1982 | Wain |
| 4,339,798 | A | 7/1982 | Hedges et al. |
| 4,448,419 | A | 5/1984 | Telnaes |
| 4,467,424 | A | 8/1984 | Hedges et al. |
| 4,494,197 | A | 1/1985 | Troy et al. |
| 4,582,324 | A | 4/1986 | Koza et al. |
| 4,618,150 | A | 10/1986 | Kimura |
| 4,624,459 | A | 11/1986 | Kaufman |
| 4,652,998 | A | 3/1987 | Koza et al. |
| 4,669,730 | A | 6/1987 | Small |
| 4,689,742 | A | 8/1987 | Troy et al. |
| 4,695,053 | A | 9/1987 | Vazquez, Jr. et al. |
| 4,732,386 | A | 3/1988 | Rayfiel |
| 4,756,531 | A | 7/1988 | DiRe et al. |
| 4,815,741 | A | 3/1989 | Small |
| 4,817,951 | A | 4/1989 | Crouch et al. |
| 4,838,552 | A | 6/1989 | Hagiwara |
| 4,842,278 | A | 6/1989 | Markowicz |
| 4,856,787 | A | 8/1989 | Itkis |
| 4,982,337 | A | 1/1991 | Burr et al. |

(Continued)

FOREIGN PATENT DOCUMENTS

| | | |
|---|---|---|
| AU | 2005225042 | 5/2006 |

(Continued)

OTHER PUBLICATIONS

50 Lions Advertisement written by Aristocrat, published Sep. 2004.

(Continued)

*Primary Examiner* — Dmitry Suhol
*Assistant Examiner* — Kevin Y Kim
(74) *Attorney, Agent, or Firm* — K&L Gates LLP

(57) ABSTRACT

Various embodiments of the disclosed gaming system and method include determining whether to initiate a win evaluation sequence for determining awards for a play of a wagering game based on the symbols generated in that play of the wagering game. In various such embodiments, the gaming system determines whether to initiate a win evaluation sequence for determining awards for a play of a wagering game based on whether a designated number of evaluation triggering symbols are randomly generated in the play of the wagering game.

44 Claims, 17 Drawing Sheets

U.S. PATENT DOCUMENTS

| | | | |
|---|---|---|---|
| 5,042,809 | A | 8/1991 | Richardson |
| 5,085,436 | A | 2/1992 | Bennett |
| 5,092,598 | A | 3/1992 | Kamille |
| 5,158,293 | A | 10/1992 | Mullins |
| 5,209,479 | A | 5/1993 | Nagao et al. |
| 5,265,874 | A | 11/1993 | Dickinson et al. |
| 5,276,312 | A | 1/1994 | McCarthy |
| 5,282,620 | A | 2/1994 | Keesee |
| 5,324,035 | A | 6/1994 | Morris et al. |
| 5,344,144 | A | 9/1994 | Canon |
| 5,393,061 | A | 2/1995 | Manship et al. |
| 5,398,932 | A | 3/1995 | Eberhardt et al. |
| 5,407,199 | A | 4/1995 | Gumina |
| 5,423,539 | A | 6/1995 | Nagao |
| 5,431,408 | A | 7/1995 | Adams |
| 5,449,173 | A | 9/1995 | Thomas et al. |
| 5,542,669 | A | 8/1996 | Charron et al. |
| 5,580,053 | A | 12/1996 | Crouch |
| 5,580,055 | A | 12/1996 | Hagiwara |
| 5,611,535 | A | 3/1997 | Tiberio |
| 5,628,684 | A | 5/1997 | Bouedec |
| 5,630,754 | A | 5/1997 | Rebane |
| 5,674,128 | A | 10/1997 | Holch et al. |
| 5,722,891 | A | 3/1998 | Inoue |
| 5,769,716 | A | 6/1998 | Saffari et al. |
| 5,772,509 | A | 6/1998 | Weiss |
| 5,779,545 | A | 7/1998 | Berg et al. |
| 5,788,573 | A | 8/1998 | Baerlocher et al. |
| 5,800,269 | A | 9/1998 | Holch et al. |
| 5,823,874 | A | 10/1998 | Adams |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| 5,871,398 | A | 2/1999 | Schneier et al. |
| 5,882,261 | A | 3/1999 | Adams |
| 5,902,184 | A | 5/1999 | Bennett et al. |
| 5,919,088 | A | 7/1999 | Weiss |
| 5,927,714 | A | 7/1999 | Kaplan |
| 5,944,606 | A | 8/1999 | Gerow |
| 5,947,820 | A | 9/1999 | Morro et al. |
| 5,949,042 | A | 9/1999 | Dietz, II et al. |
| 5,951,397 | A | 9/1999 | Dickinson |
| 5,954,582 | A | 9/1999 | Zach |
| 5,980,384 | A | 11/1999 | Barrie |
| 5,984,781 | A | 11/1999 | Sunaga |
| 5,997,401 | A | 12/1999 | Crawford |
| 6,004,207 | A | 12/1999 | Wilson, Jr. et al. |
| 6,015,346 | A | 1/2000 | Bennett |
| 6,017,032 | A | 1/2000 | Grippo et al. |
| 6,024,640 | A | 2/2000 | Walker et al. |
| 6,033,307 | A | 3/2000 | Vancura |
| 6,056,642 | A | 5/2000 | Bennett |
| 6,089,976 | A | 7/2000 | Schneider et al. |
| 6,089,977 | A | 7/2000 | Bennett |
| 6,089,982 | A | 7/2000 | Holch et al. |
| 6,093,102 | A | 7/2000 | Bennett |
| 6,102,798 | A | 8/2000 | Bennett |
| 6,113,098 | A | 9/2000 | Adams |
| 6,120,031 | A | 9/2000 | Adams |
| 6,120,378 | A | 9/2000 | Moody |
| 6,126,542 | A | 10/2000 | Fier |
| 6,132,311 | A | 10/2000 | Williams |
| 6,146,271 | A | 11/2000 | Kadlic |
| 6,146,272 | A | 11/2000 | Walker et al. |
| 6,146,273 | A | 11/2000 | Olsen |
| 6,149,521 | A | 11/2000 | Sanduski |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,168,520 | B1 | 1/2001 | Baerlocher et al. |
| 6,168,521 | B1 | 1/2001 | Luciano et al. |
| 6,174,233 | B1 | 1/2001 | Sunaga et al. |
| 0,183,361 | A1 | 2/2001 | Cummings et al. |
| 6,190,254 | B1 | 2/2001 | Bennett |
| 6,190,255 | B1 | 2/2001 | Thomas et al. |
| 6,200,217 | B1 | 3/2001 | Osawa |
| 6,203,430 | B1 | 3/2001 | Walker et al. |
| 6,210,275 | B1 | 4/2001 | Olsen |
| 6,210,276 | B1 | 4/2001 | Mullins |
| 6,217,448 | B1 | 4/2001 | Olsen |
| 6,220,961 | B1 | 4/2001 | Keane et al. |
| 6,227,971 | B1 | 5/2001 | Weiss |
| 6,241,606 | B1 | 6/2001 | Riendeau et al. |
| 6,251,013 | B1 | 6/2001 | Bennett |
| 6,254,480 | B1 | 7/2001 | Zach |
| 6,261,178 | B1 | 7/2001 | Bennett |
| 6,270,409 | B1 | 8/2001 | Shuster |
| 6,270,412 | B1 | 8/2001 | Crawford et al. |
| 6,273,820 | B1 | 8/2001 | Haste, III |
| 6,280,328 | B1 | 8/2001 | Holch et al. |
| 6,293,866 | B1 | 9/2001 | Walker |
| 6,309,298 | B1 | 10/2001 | Gerow |
| 6,309,300 | B1 | 10/2001 | Glavich |
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,322,078 | B1 | 11/2001 | Adams |
| 6,325,716 | B1 | 12/2001 | Walker et al. |
| 6,346,043 | B1 | 2/2002 | Colin et al. |
| 6,347,996 | B1 | 2/2002 | Gilmore et al. |
| 6,358,147 | B1 | 3/2002 | Jaffe et al. |
| 6,358,151 | B1 | 3/2002 | Enzminger et al. |
| 6,364,314 | B1 | 4/2002 | Canterbury |
| 6,368,218 | B2 | 4/2002 | Angell, Jr. |
| 6,402,614 | B1 | 6/2002 | Schneier et al. |
| 6,413,162 | B1 | 7/2002 | Baerlocher et al. |
| 6,419,583 | B1 | 7/2002 | Crumby et al. |
| 6,425,824 | B1 | 7/2002 | Baerlocher et al. |
| 6,439,993 | B1 | 8/2002 | O'Halloran |
| 6,450,885 | B2 | 9/2002 | Schneier et al. |
| 6,454,648 | B1 | 9/2002 | Kelly et al. |
| RE37,885 | E | 10/2002 | Acres et al. |
| 6,461,241 | B1 | 10/2002 | Webb et al. |
| 6,464,581 | B1 | 10/2002 | Yoseloff et al. |
| 6,475,086 | B2 | 11/2002 | Zach |
| 6,491,584 | B2 | 12/2002 | Graham et al. |
| 6,494,454 | B2 | 12/2002 | Adams |
| 6,508,711 | B1 | 1/2003 | Ono |
| 6,517,432 | B1 | 2/2003 | Jaffe |
| 6,524,184 | B1 | 2/2003 | Lind et al. |
| 6,527,638 | B1 | 3/2003 | Walker et al. |
| 6,533,664 | B1 | 3/2003 | Crumby |
| 6,537,150 | B1 | 3/2003 | Luciano et al. |
| 6,551,187 | B1 | 4/2003 | Jaffe |
| 6,558,254 | B2 | 5/2003 | Baelocher et al. |
| 6,561,900 | B1 | 5/2003 | Baerlocher et al. |
| 6,565,433 | B1 | 5/2003 | Baerlocher et al. |
| 6,599,187 | B2 | 7/2003 | Gerow |
| 6,602,137 | B2 | 8/2003 | Kaminkow et al. |
| 6,607,439 | B2 | 8/2003 | Schneier et al. |
| 6,609,971 | B2 | 8/2003 | Vancura |
| 6,609,974 | B2 | 8/2003 | Mead et al. |
| 6,616,142 | B2 | 9/2003 | Adams |
| 6,619,660 | B2 | 9/2003 | Schaefer et al. |
| 6,648,758 | B2 | 11/2003 | Bennett et al. |
| 6,672,960 | B1 | 1/2004 | B-Jensen |
| 6,676,126 | B1 | 1/2004 | Walker et al. |
| 6,685,562 | B1 | 2/2004 | Rantanen |
| 6,695,695 | B2 | 2/2004 | Angel |
| 6,729,621 | B2 | 5/2004 | Moody |
| 6,729,961 | B1 | 5/2004 | Millerschone |
| 6,731,313 | B1 | 5/2004 | Kaminkow |
| 6,733,385 | B1 | 5/2004 | Enzminger et al. |
| 6,749,500 | B1 | 6/2004 | Nelson et al. |
| 6,805,349 | B2 | 10/2004 | Baerlocher et al. |
| 6,905,406 | B2 | 6/2005 | Kaminkow et al. |
| 6,932,699 | B2 | 8/2005 | Ueda et al. |
| 6,988,947 | B2 | 1/2006 | Baerlocher et al. |
| 7,048,275 | B2 | 5/2006 | Adams |
| 7,070,502 | B1 | 7/2006 | Bussick et al. |
| 7,166,028 | B2 | 1/2007 | Fasbender et al. |
| 7,169,042 | B2 | 1/2007 | Muir et al. |
| 7,226,359 | B2 | 6/2007 | Bussick et al. |
| 7,396,279 | B2 | 7/2008 | Berman et al. |
| 7,481,709 | B2 | 1/2009 | Bussick et al. |

| | | | | |
|---|---|---|---|---|
| 7,559,837 | B1 * | 7/2009 | Yoseloff et al. | 463/21 |
| 7,758,414 | B1 * | 7/2010 | Marks et al. | 463/20 |
| 7,780,511 | B2 * | 8/2010 | Casey et al. | 463/10 |
| 2001/0054794 | A1 | 12/2001 | Cole et al. | |
| 2002/0010013 | A1 | 1/2002 | Walker et al. | |
| 2002/0025844 | A1 | 2/2002 | Casey et al. | |
| 2002/0098882 | A1 | 7/2002 | Lind et al. | |
| 2002/0098883 | A1 | 7/2002 | Packes, Jr. et al. | |
| 2002/0196342 | A1 | 12/2002 | Walker et al. | |
| 2003/0045345 | A1 | 3/2003 | Berman | |
| 2003/0060257 | A1 | 3/2003 | Katz et al. | |
| 2003/0060261 | A1 | 3/2003 | Katz et al. | |
| 2003/0060276 | A1 | 3/2003 | Walker et al. | |
| 2003/0083120 | A1 | 5/2003 | DeWall et al. | |
| 2003/0190943 | A1 | 10/2003 | Walker et al. | |
| 2004/0036212 | A1 | 2/2004 | Walker et al. | |
| 2004/0038723 | A1 | 2/2004 | Schneier et al. | |
| 2004/0053677 | A1 | 3/2004 | Hughs-Baird | |
| 2004/0209673 | A1 | 10/2004 | Shiraishi | |
| 2005/0054418 | A1 * | 3/2005 | Baerlocher | 463/20 |
| 2006/0089191 | A1 | 4/2006 | Singer et al. | |
| 2008/0108411 | A1 | 5/2008 | Jensen et al. | |
| 2008/0132320 | A1 | 6/2008 | Rodgers | |
| 2009/0124347 | A1 * | 5/2009 | Rodgers et al. | 463/21 |

FOREIGN PATENT DOCUMENTS

| | | |
|---|---|---|
| CA | 2403 032 | 3/2003 |
| EP | 0 238 289 | 9/1987 |
| EP | 0 945 837 | 9/1999 |
| EP | 0 948 408 | 3/2000 |
| EP | 1 199 689 | 4/2002 |
| EP | 1 205 894 | 5/2002 |
| EP | 1 298 607 | 4/2003 |
| EP | 1 422 673 | 5/2004 |
| EP | 1 498 859 | 1/2005 |
| EP | 1 513 115 | 3/2005 |
| EP | 1 513 117 | 3/2005 |
| EP | 1 531 434 | 5/2005 |
| EP | 1 560 179 | 8/2005 |
| GB | 2 226 907 | 7/1990 |
| GB | 2 262 642 | 6/1993 |
| GB | 2 328 311 | 2/1999 |
| GB | 2 113 881 | 8/2003 |
| GB | 2 393 019 | 3/2004 |
| WO | WO 97/32285 | 9/1997 |
| WO | WO 00/66235 | 11/2000 |
| WO | WO 01/15055 | 3/2001 |
| WO | WO 01/19476 | 3/2001 |
| WO | WO 01/21268 | 3/2001 |
| WO | WO 01/28647 | 4/2001 |
| WO | WO 01/74464 | 10/2001 |
| WO | WO 02/077935 | 10/2002 |
| WO | WO 02/102484 | 12/2002 |
| WO | WO 03/026759 | 4/2003 |
| WO | WO 03/049053 | 6/2003 |
| WO | WO 03/049055 | 6/2003 |
| WO | WO 03/089084 | 10/2003 |
| WO | WO 03/089088 | 10/2003 |
| WO | WO 2005/002697 | 1/2005 |
| WO | WO 2005/015826 | 2/2005 |
| WO | WO 2005/086018 | 9/2005 |
| WO | WO 2007/021724 | 2/2007 |

OTHER PUBLICATIONS

50 Lions Article, Article in Strictly Slots, published in Apr. 2005.
Bingo Advertisement, written by Casino Data System, published in 1998.
Black Panther, Article in Strictly Slots, published in 2000.
Break the Spell, Article in Strictly Slots, published in Sep. 2000.
Crazy Fruits Advertisement, written by Atronic, published in 2000.
Crazy Fruits, Article in Strictly Slots, published in 2001.
Enchanted Unicorn Advertisement, written by IGT, published in 2001.
Evil Keneivel Advertisement, written by IGT, published in 2001.
Five Card Instant Bingo Advertisement , written by IGT, published in 2000.
Fortune Cookie Advertisement, written by IGT, published in 2000.
Laurel and Hardy Advertisement, written by Shuffle Master Gaming, published in 2002.
Lil' Lucy, Article in Strictly Slots, published in Nov. 2003.
Regis Cash Club Advertisement, written by IGT, published in 2000.
South Park Advertisement, written by IGT, published in 2000.
Stooges II Article, written by Strictly Slots, published in Jun. 2001.
Texas Tea Advertisement written by IGT, published in 2000.
Video Poker Strategy Guide description, http://www.chessandpoker.com/jacks_or_better_video_poker_strategy.html, website printed Jan. 28, 2009.

* cited by examiner

FIG. 3A

100

| SYMBOLS | CREDITS |
|---|---|
| AAA | 50 |
| AAAA | 75 |
| AAAAA | 100 |

16

GAMING SYSTEM ENABLING A SYMBOL DRIVEN WIN EVALUATION METHOD

BACKGROUND

Gaming machines which provide players awards in primary or base wagering games are well known. Gaming machines generally require the player to place or make a wager to activate the primary or base wagering game. In many of these gaming machines, an award is based on the player obtaining a winning symbol or symbol combination and on the amount of the wager (e.g., the higher the wager, the higher the award). Symbols or symbol combinations which are less likely to occur usually provide higher awards. Symbols or symbol combinations which are more likely to occur usually provide lower awards.

Certain players enjoy playing wagering games which provide both lower awards which are more likely to occur and higher awards which are less likely to occur. However, certain other players would rather only receive higher awards, even if such awards are provided less frequently. These players prefer more volatility in their gaming experience and find wagering games including too many lower and frequent awards less exciting and entertaining. Eliminating or lowering the number of these lower and frequent awards to make the wagering game more exciting for these players is not possible in some wagering game configurations in part because in these configurations, the symbols or symbol combinations associated with lower awards are components of the symbol combinations associated with higher awards.

For example, in a five-reel slot type game, if "A-A-A," "A-A-A-A" and "A-A-A-A-A" are winning symbol combinations, it is difficult to eliminate the "A-A-A" symbol combination from being evaluated because it makes up part of the other winning symbol combinations. In such cases, eliminating "A-A-A" from a win evaluation would eliminate the possibility of a player receiving a likely higher award for "A-A-A-A" or "A-A-A-A-A."

Thus, a need exists for a wagering game which limits the availability of lower and frequent awards, while maintaining a reasonable payback percentage.

SUMMARY

Various embodiments of the disclosed gaming system and method include determining whether to initiate a win evaluation sequence for determining awards for a play of a wagering game based on the symbols generated in that play of the wagering game. In various such embodiments, the gaming system determines whether to initiate a win evaluation sequence for determining awards for a play of a wagering game based on whether a designated number of evaluation triggering symbols are randomly generated in the play of the wagering game.

In various embodiments, the evaluation triggering symbols which are evaluated to determine which of the plurality of different win evaluation sequences to employ for the play of the wagering game are also evaluated by the employed win evaluation sequence. In other words, the evaluation triggering symbols can be part of potential winning symbol combinations in the employed win evaluation sequence.

The evaluation triggering symbol can be any suitable symbol. In certain embodiments, the evaluation triggering symbol is or also functions as a multiplier symbol (e.g., "2×") or any other suitable symbol for the play of the game. It should be appreciated that in various embodiments, the designated number of evaluation triggering symbols may include the same evaluation triggering symbol or different evaluation triggering symbols.

In one example embodiment, upon an input of a wager in the wagering game, the gaming system randomly determines and displays a plurality of symbols from a set of symbols, the set of symbols including at least one evaluation triggering symbol. The gaming system first determines if the designated number of evaluation triggering symbols have been randomly generated in the play of the wagering game. Then, the gaming system determines whether to initiate a win evaluation sequence for determining awards for a play of the wagering game based on whether the designated number of evaluation triggering symbols were randomly generated in the play of the wagering game. If the designated number of evaluation triggering symbols are not generated, the gaming system does not evaluate the symbols for winning symbol combinations no matter what symbols are displayed.

In various such embodiments, after determining whether to initiate a win evaluation sequence, the gaming system displays whether or not the win evaluation sequence will or will not be initiated and why the evaluation sequence will or will not be initiated. This enables players to better understand how or why the gaming system is determining whether or not to evaluate the randomly generated symbols for winning symbol combinations. For example, but for such a display, a player could see a winning symbol combination and one multiplier symbol and wonder why the gaming system is not evaluating for and providing them an award for the displayed winning symbol combination.

In this embodiment, if the gaming system determines that the designated number of evaluation triggering symbol (e.g., two) are not displayed in the play of the game, the gaming system does not evaluate the randomly generated symbols for predetermined winning symbol combinations.

If the gaming system determines that the designated number of the evaluation triggering symbol are displayed in the play of the game (e.g., two "2×" multiplier symbols), the gaming system determines if at least one of a plurality of different predetermined winning symbol combinations of a paytable are displayed. If any of the plurality of different predetermined winning symbol combinations are displayed, the gaming system determines any awards associated with the displayed predetermined winning symbol combinations using the paytable and displays such awards. The occurrence of the designated number of the evaluation triggering symbol (e.g., two "2×" multiplier symbols) as a prerequisite to the gaming system initiating a win evaluation sequence makes the game exciting for higher volatility players. Symbol combinations which would have been associated with relatively lower awards will most likely be associated with higher awards in conjunction with the occurrence of the designated triggering symbols. The game maintains a reasonable payback percentage by generally providing fewer lower and frequent awards, while providing higher awards, when awards are provided.

It should be appreciated that in various other embodiments, the designated number of the evaluation triggering symbol may be lower (e.g., one), but other game features make it more likely that a winning symbol combination being evaluated will ultimately be associated with a relatively higher award.

For example, in one embodiment, after determining to initiate a win evaluation sequence for the play of the game, but before initiating the win evaluation sequence, the gaming system converts designated symbols having a predefined positional relationship to the evaluation triggering symbol into different symbols. In one such embodiment, the evaluation triggering symbol and the different symbols into which the designated symbols are converted are or function as multiplier symbols. The wagering game of this embodiment still appeals to higher volatility players because due to the above symbol conversion process the gaming system performs if the designated number of the evaluation triggering symbol are generated, more than likely, more than one multiplier symbol will ultimately be used by the gaming system to ultimately determine the award to provide the player. In other words, in such embodiment, the gaming system generating a single evaluation triggering symbol which functions as a multiplier and subsequently performing the above symbol conversion process can have the same effect on an award as the gaming device initially generating at least two multiplier symbols.

Additional features and advantages are described herein, and will be apparent from, the following Detailed Description and the figures.

BRIEF DESCRIPTION OF THE FIGURES

FIG. 3A includes a view of a paytable for a wagering game in accordance with one embodiment of the gaming system disclosed herein.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
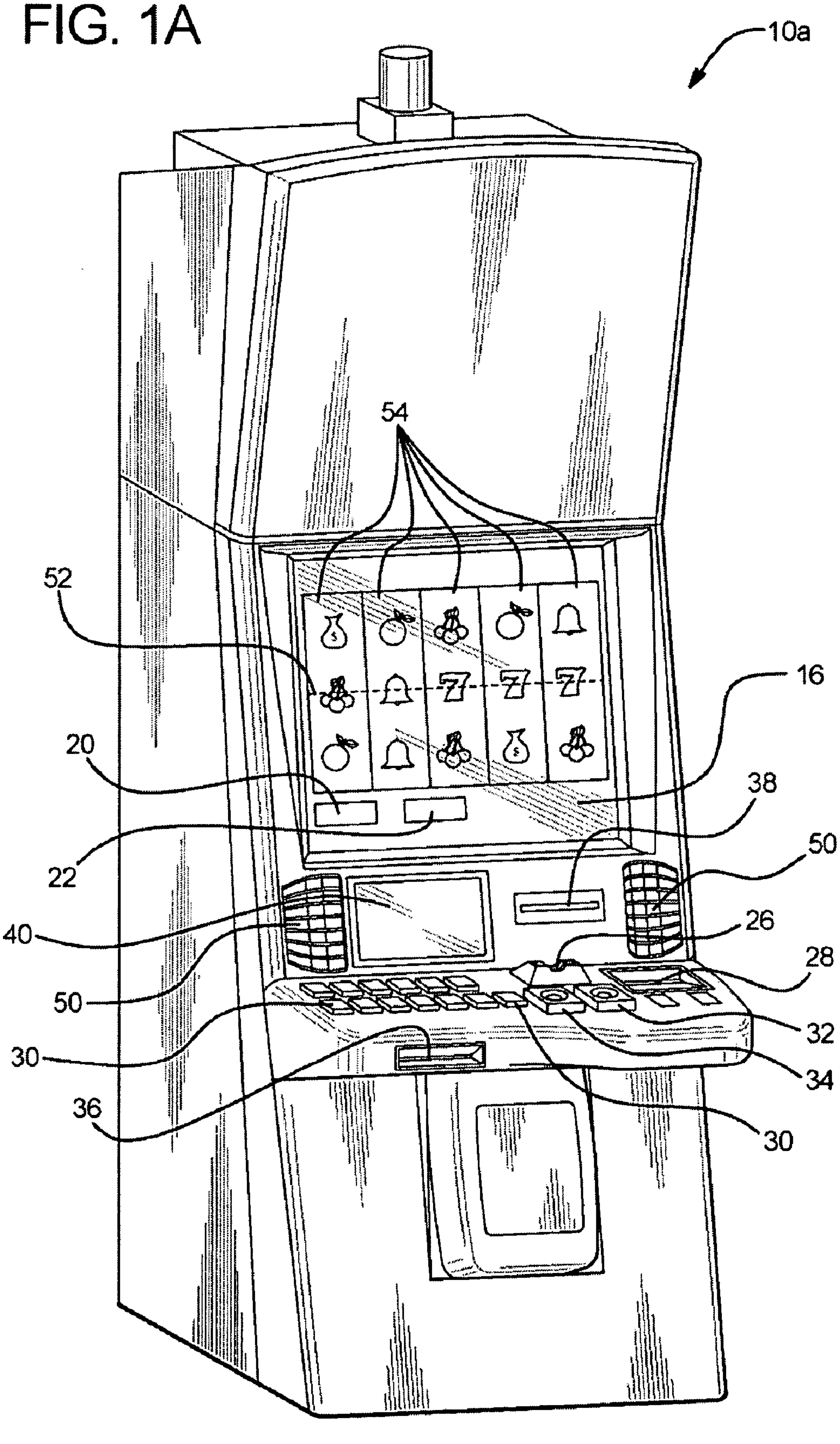
FIGS. 1A and 1B are front perspective views of alternative embodiments of gaming devices disclosed herein.
Figure 1B:
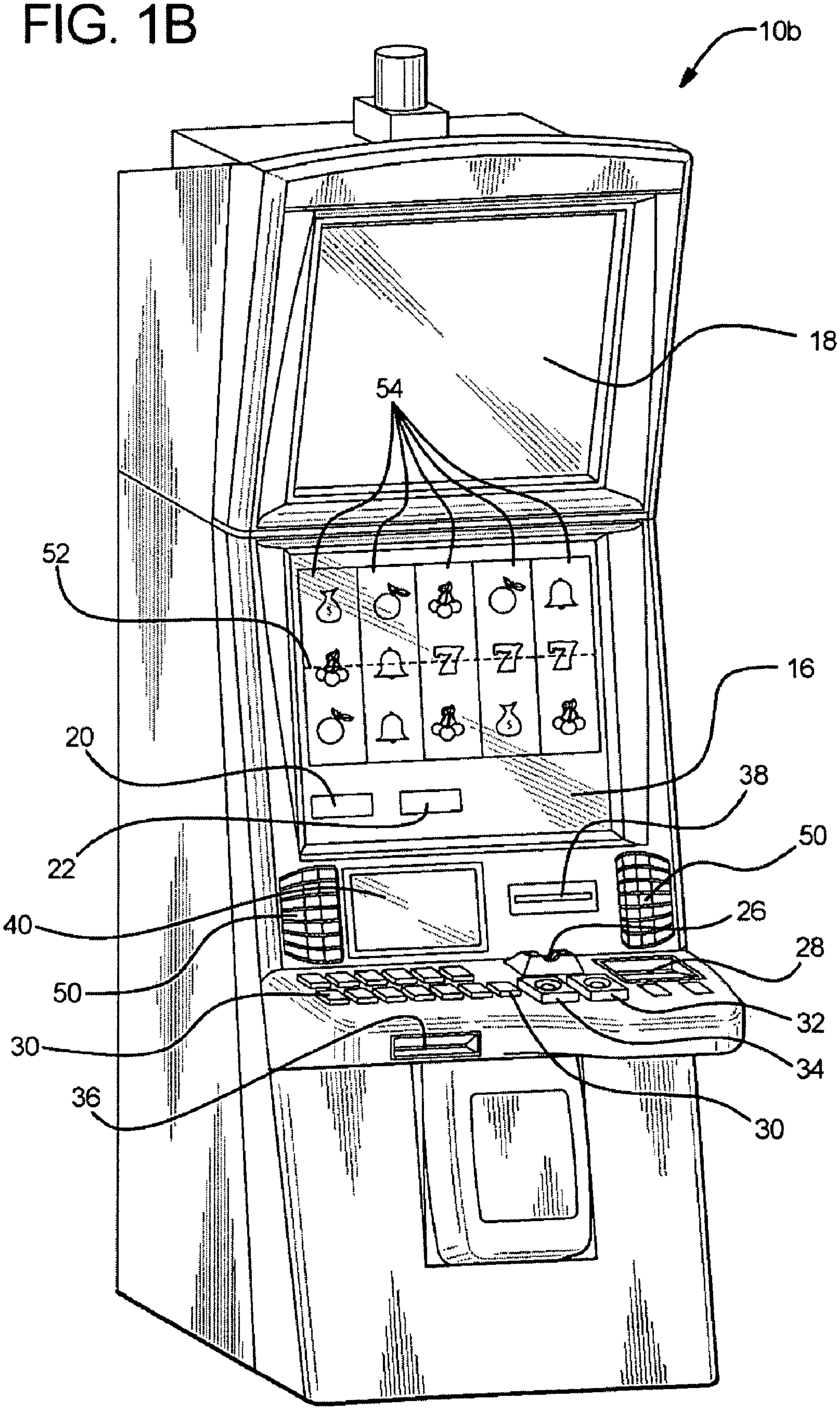

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
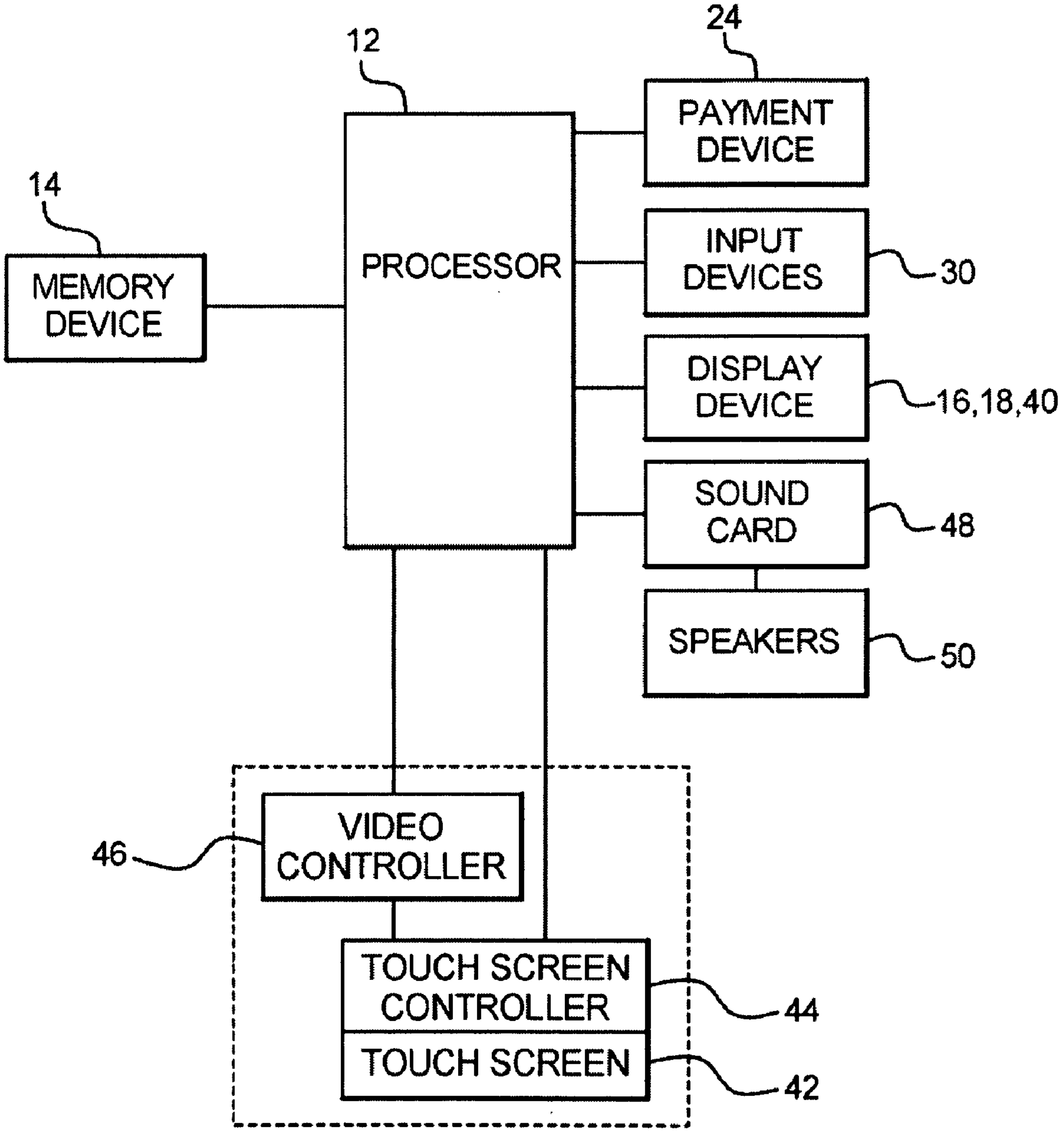
FIG. 2A is a schematic block diagram of the electronic configuration of one embodiment of a gaming device disclosed herein.
Figure 2B:
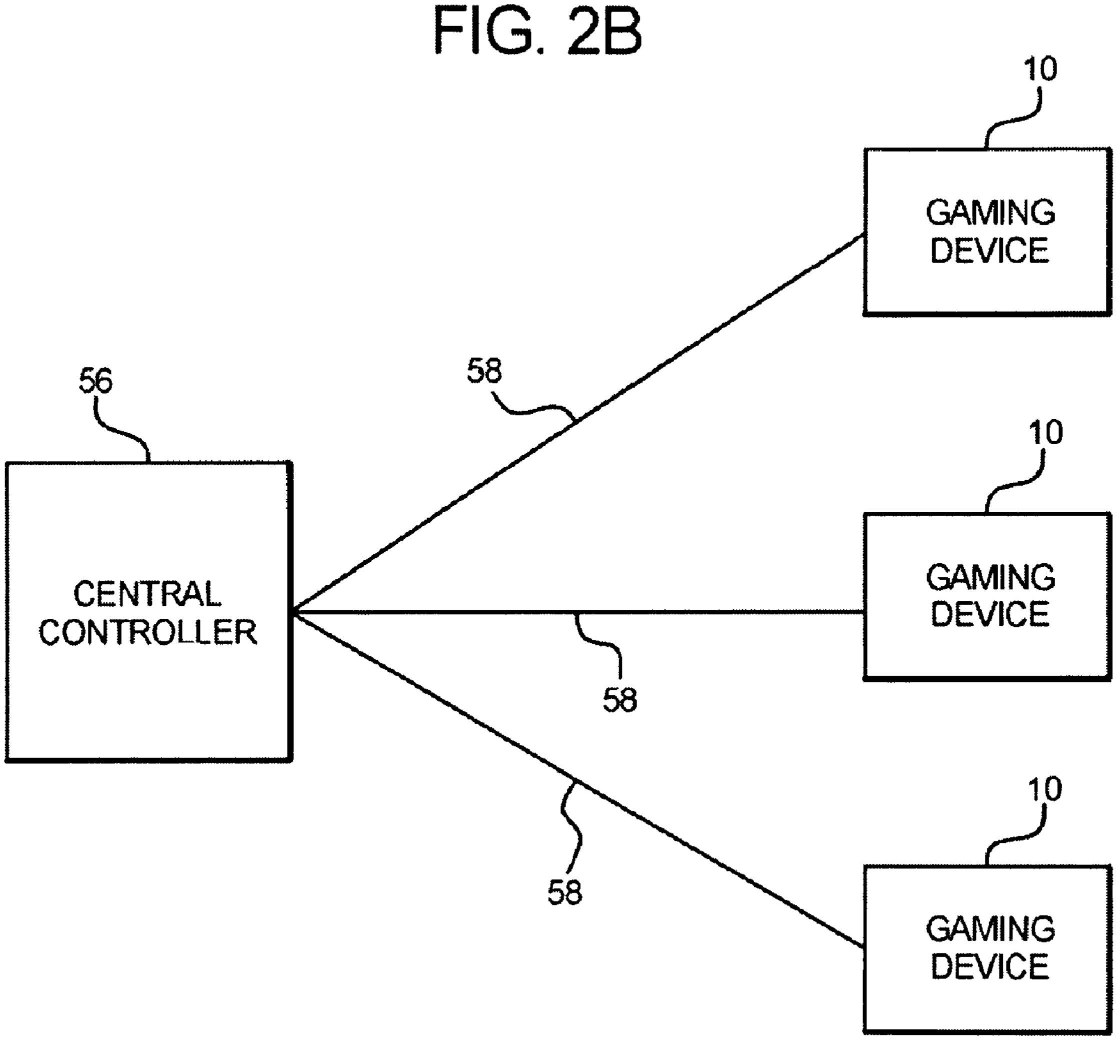
FIG. 2B is a schematic diagram of the central controller in communication with a plurality of gaming devices in accordance with one embodiment of the gaming system disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, as illustrated in FIG. 28, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices.

In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the players surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching, a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality, of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

SYMBOL DRIVEN WIN EVALUATION EMBODIMENTS

Various embodiments of the disclosed gaming system and method include determining whether to initiate a win evaluation sequence for determining awards for a play of a wagering game based on the symbols generated in that play of the wagering game. In various such embodiments, the gaming system determines whether to initiate a win evaluation sequence for determining awards for a play of a wagering game based on whether a designated number of evaluation triggering symbols are randomly generated in the play of the wagering game.

For example, referring to FIG. 3A, in one embodiment the wagering game has a paytable 100 including a plurality of different predetermined winning symbol combinations each associated with one of a plurality of different awards.

In this embodiment, the evaluation triggering symbol is the multiplier symbol "2×" and the designated number of the evaluation triggering symbol is two. However, it should be appreciated that in various other embodiments the evaluation triggering symbol may be any suitable symbol and the designated number of evaluation triggering symbols may be any suitable number of symbols. Additionally, although in this embodiment the designated number of evaluation triggering symbols includes the same evaluation triggering symbol, in various other embodiments, the designated number of evaluation triggering symbols my include different evaluation triggering symbols (e.g., "2×" and "3×").

In various embodiments, the evaluation triggering symbols are also evaluated by the employed win evaluation sequence. In other words, the evaluation triggering symbols are part of one or more potential winning symbol combinations in the employed win evaluation sequence. However, it should be appreciated that in various other embodiments, the evaluation triggering symbols are not part of winning symbol combinations.

Figure 3B:
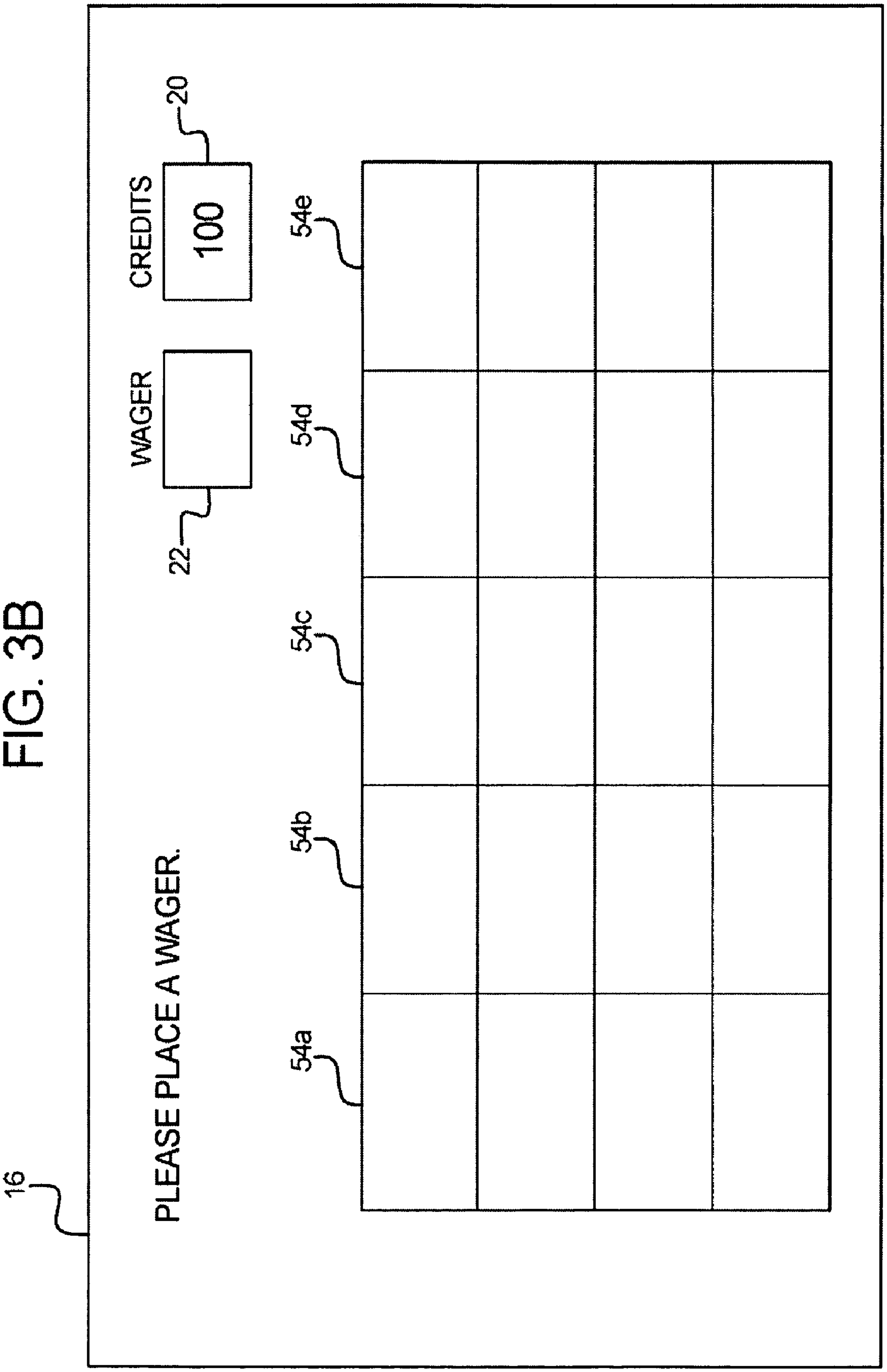
FIGS. 3B, 3C, 3D, 3E, 3F and 3G include front views of a gaming device display enabling a play of a wagering game in accordance with one of embodiment of the gaming system disclosed herein.
Figure 3C:
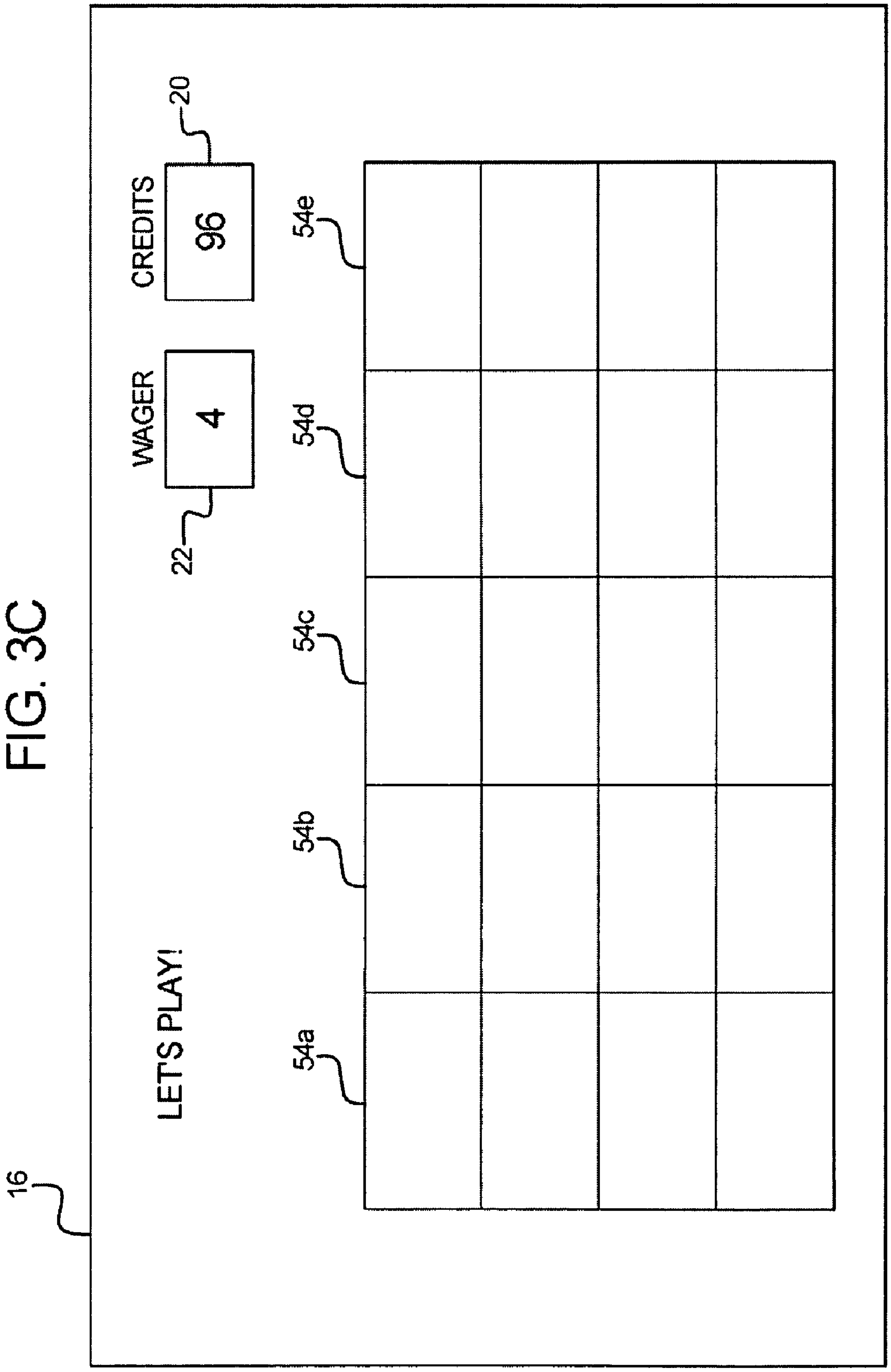

Referring specifically to FIG. 3B, the gaming device display 16 prompts the player to place a wager on a play of the game. The player wagers four credits, as illustrated in wager display 22 in FIG. 3C. In this embodiment, by wagering four credits, the player wagers one credit on each of paylines 52*a*, 52*b*, 52*c* and 52*d*. The gaming system randomly determines and displays a plurality of symbols from a set of symbols including the evaluation triggering symbol, as illustrated in FIG. 3D.

The gaming system determines whether the designated number, two, of the "2×" symbol are displayed in the play of the game. In this embodiment, if the gaming system determines that two or more of the "2×" symbol are not displayed in the play of the game, the gaming system does not evaluate the symbols for predetermined winning symbol combinations. If the gaming system determines that two or more of the "2×" symbol are displayed, the gaming system determines if at least one of the plurality of different predetermined winning symbol combinations of the paytable 100 of FIG. 3A are displayed.

Figure 3D:
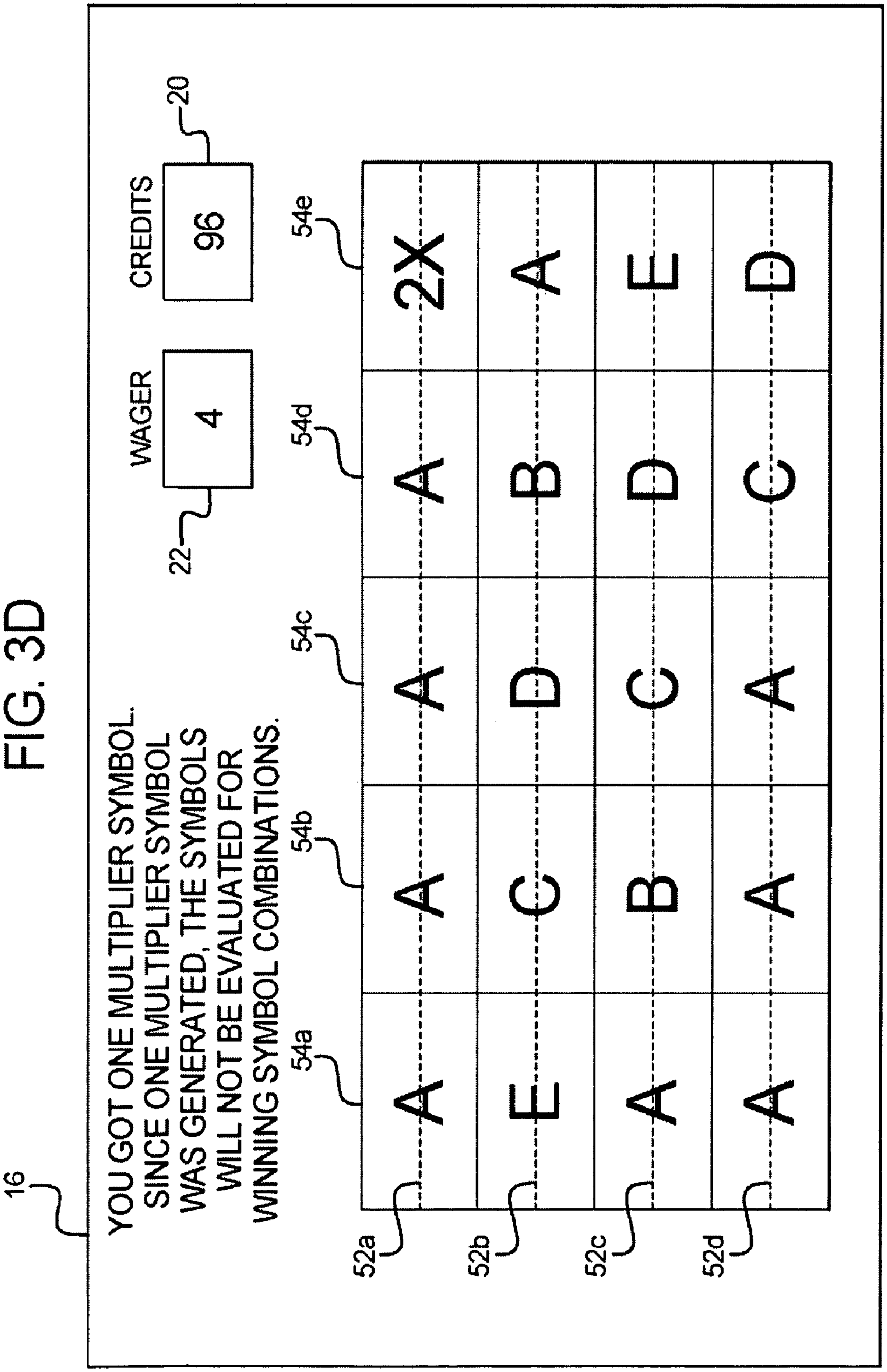
Figure 3E:
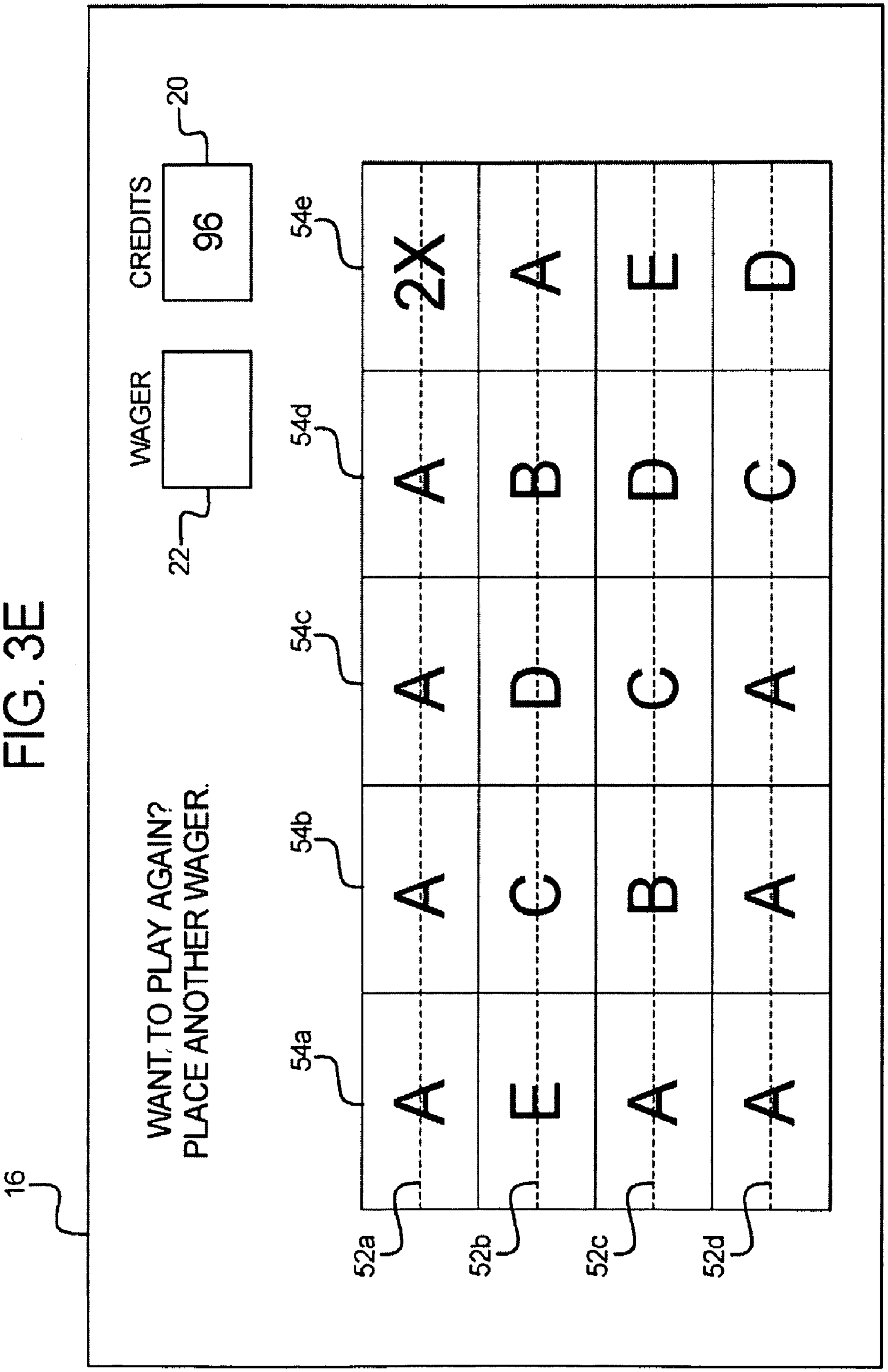

Referring to FIG. 3D, the gaming device display 16 indicates that because one "2×" multiplier symbol is displayed on reel 54*e*, the symbols will not be evaluated for winning symbol combinations. Higher volatility players do not mind not receiving the award of 150 credits associated with the symbol combination "A-A-A-A" after the application of a "2×" multiplier in FIG. 3D, because they get excitement from receiving higher awards (e.g., if the gaming system generates more multiplier symbols), even if less frequently.

Figure 3F:
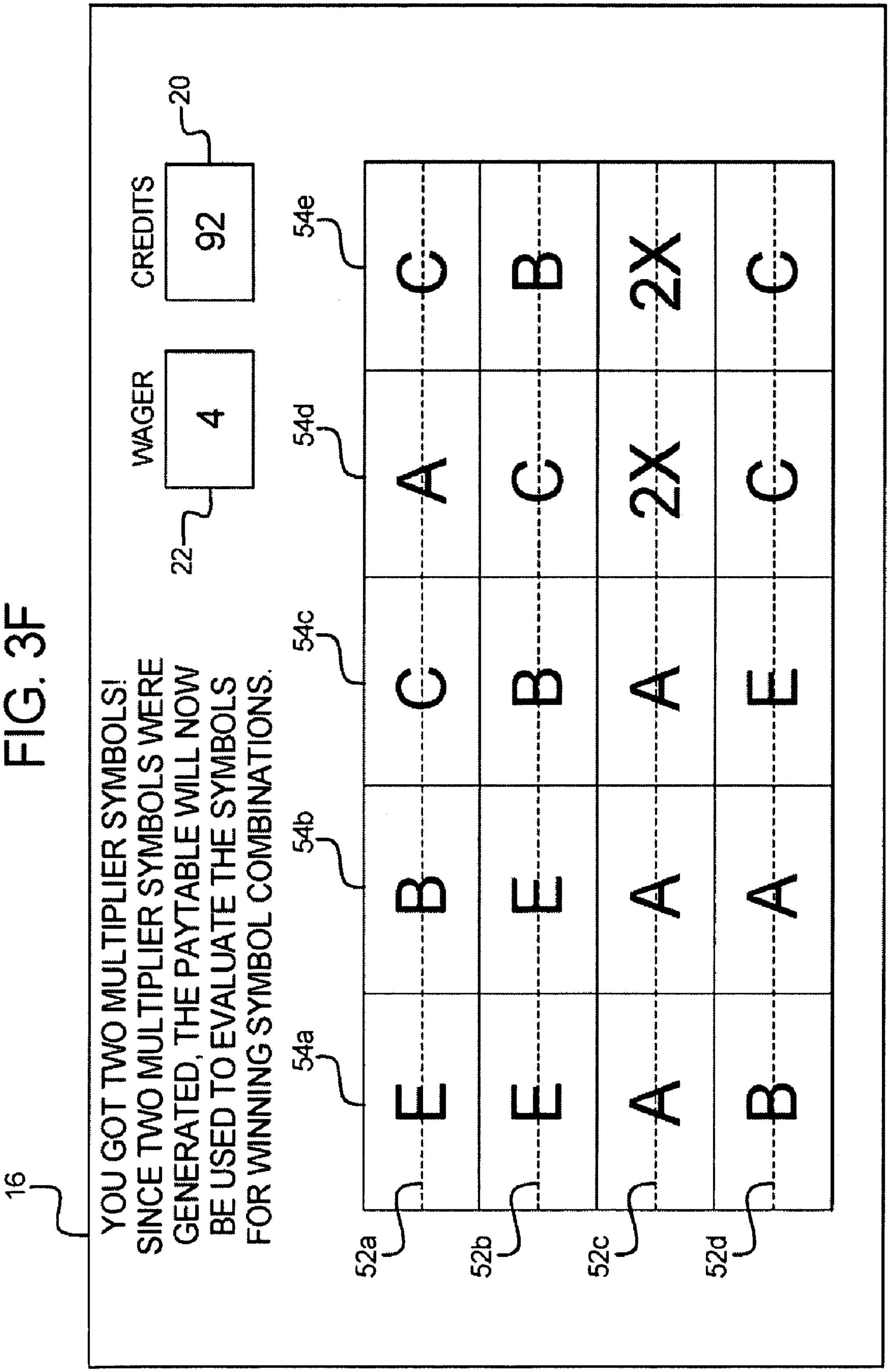

Referring now to FIG. 3F, the player places an additional wager of four credits for another play of the game, as illustrated in wager display 22. The player again wagered one credit on each of paylines 52*a*, 52*b*, 52*c* and 52*d* for the play of the game by wagering four credits. The gaming system randomly determines and displays a plurality of symbols from a set of symbols including the evaluation triggering symbol, as illustrated in FIG. 3F.

Figure 3G:
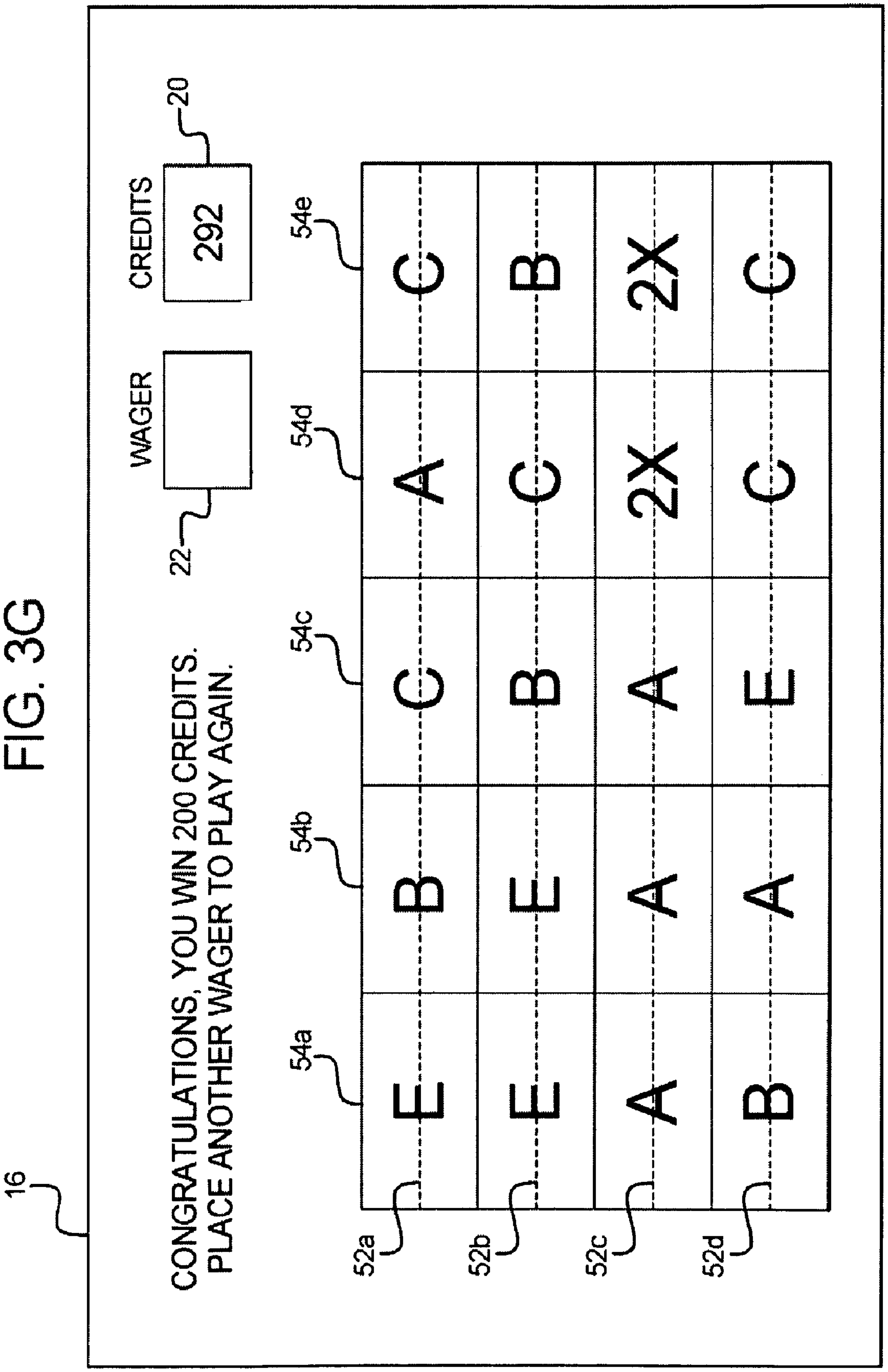

The gaming system again determines whether the designated number, two, of the "2×" symbol are displayed. Referring to FIG. 3F, the gaming device display 16 indicates that because two "2×" multiplier symbol are displayed on reels 54*d* and 54*e* in the play of the game, the gaming system will evaluate the symbols for winning symbol combinations using paytable 100. The gaming system determines that the symbol combination "A-A-A" on payline 52*c* is associated with an award of 50 credits, as illustrated in paytable 100 in FIG. 3A. The gaming device applies the multiplier of four associated with two "2×" symbols to the award of 50 credits, and multiplies the determined award of 200 credits by the one credit wagered on payline 52*c*. Accordingly, as illustrated in FIG. 3G, the gaming system displays an award of 200 credits and adds 200 credits to the credit display 20. In this example, the symbol combination "A-A-A", although associated with a relatively small award, still entertains certain higher volatility players because the gaming system applies a multiplier of four to the award.

Referring now to FIGS. 4A to 4F, in another embodiment, the wagering game also utilizes paytable 100 of FIG. 3A. In this embodiment, the designated number of the evaluation triggering symbol is one. However, if the gaming system determines that the designated number of the evaluation triggering symbol is generated, before performing the win evaluation sequence, the gaming system causes a conversion of certain designated symbols of the plurality of symbols into different symbols based on their location relative to the evaluation triggering symbol and already converted symbols.

In the embodiment specifically illustrated in FIGS. 4A to 4F, the wagering game is associated with a "Wild Fire" theme. It should be appreciated that in various embodiments, the wagering game may be associated with any suitable game theme (e.g., a "Lock and Key" theme in which a "key" symbol "unlocks" additional win evaluations).

In this embodiment, the evaluation triggering symbol is a "Wild Fire" symbol that has the effect of a multiplier of two. It should be appreciated that in various other embodiments the evaluation triggering symbol may be any suitable symbol and the designated number of evaluation triggering symbols may be any suitable number of symbols.

Figure 4A:
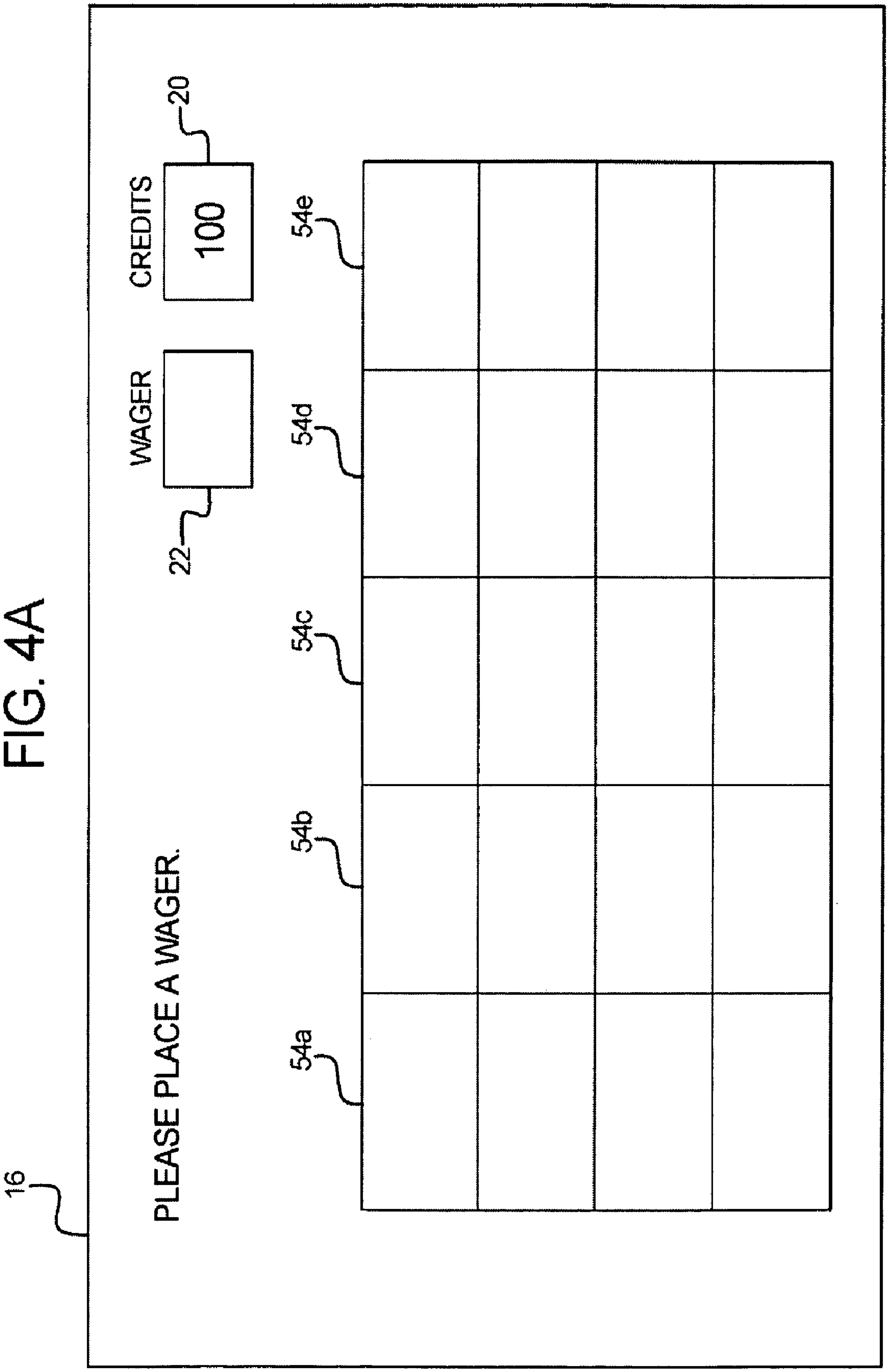
FIGS. 4A, 4B, 4C, 4D, 4E and 4F include front views of a gaming device display enabling a play of a wagering game in accordance with one of embodiment of the gaming system disclosed herein.
Figure 4B:
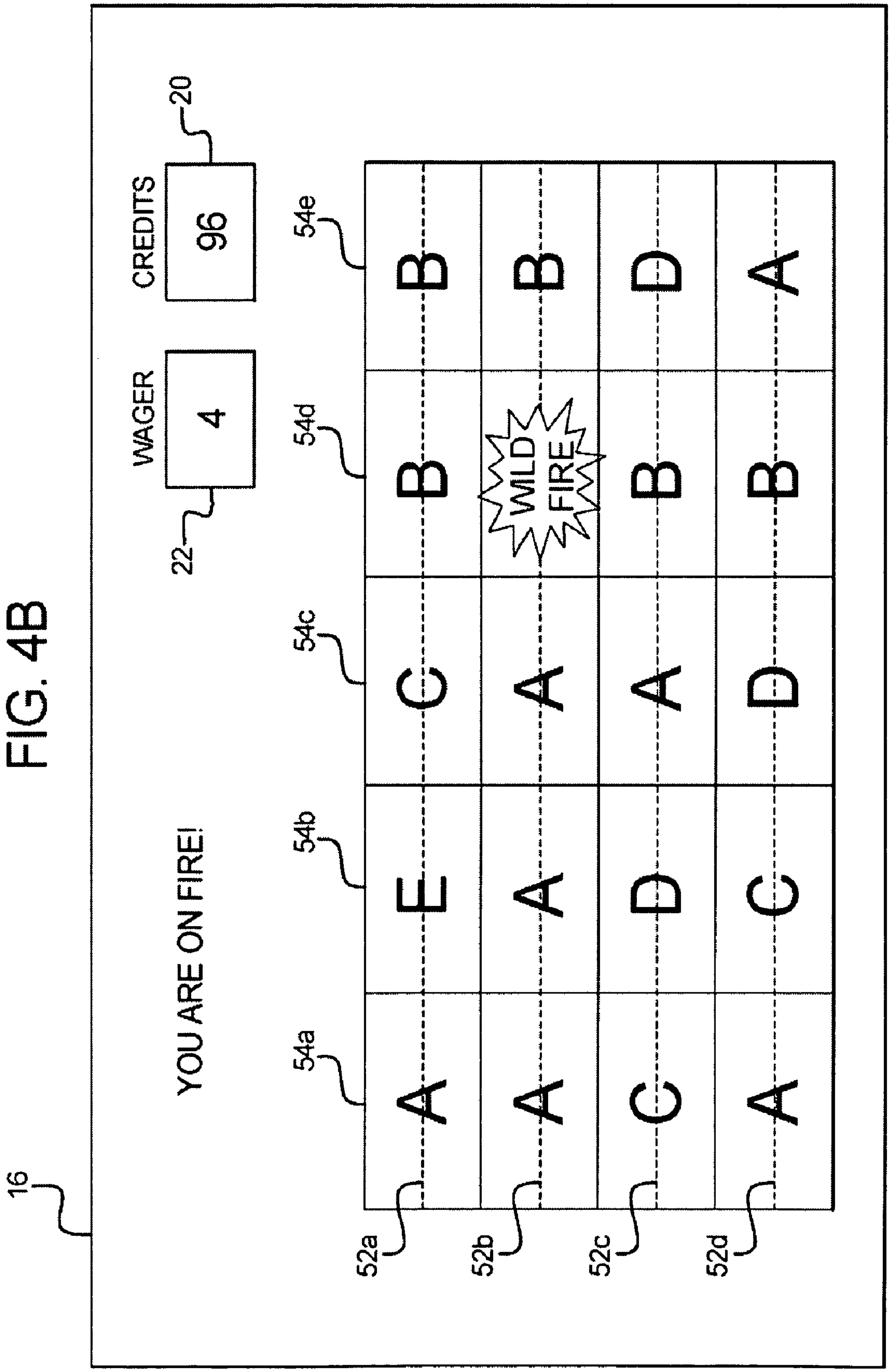

Referring specifically to FIG. 4A, the gaming device display 16 prompts the player to place a wager on a play of the game. The player wagers four credits, as illustrated in wager display 22 in FIG. 4B. In this embodiment, by wagering four credits, the player wagers one credit on each of paylines 52*a*, 52*b*, 52*c* and 52*d* for the play of the game. The gaming system randomly determines and displays a plurality of symbols from a set of symbols, as illustrated in FIG. 4B.

The gaming system determines whether the designated number, one, of the "Wild Fire" symbol is displayed. In this embodiment, if the gaming system determines that the "Wild Fire" symbol is not displayed, the gaming system does not evaluate the symbols for predetermined winning symbol combinations. If the gaming system determines that one or more of the "Wild Fire" symbol are displayed, the gaming system determines if at least one of the plurality of different predetermined winning symbol combinations of the paytable 100 of FIG. 3A are displayed.

In this embodiment, after determining whether to evaluate the symbols for predetermined winning symbol combinations, but before employing the win evaluation sequence, the gaming system converts certain designated symbols into different symbols. In this case, the designated symbols are "B" symbols. It should be appreciated that although this embodiment, the designated symbol is a "B" symbol, in various other embodiments, the designated symbol is a royal symbol (e.g., a jack, queen, or king in a card game embodiment) or a major symbol (e.g., a symbol which is generally part of one or more symbol combinations associated with relatively higher awards). It should also be appreciated that in various other embodiments, the game includes multiple different such designated symbols.

In this embodiment, the gaming system converts "B" symbols having a predefined positional relationship to the "Wild Fire" symbol into "2×" multiplier symbols (which as part of the wagering game theme, appear to catch fire). In this embodiment, the predefined positional relationship encompasses "B" symbols located at symbol positions directly to the top, bottom, left and right of the symbol position at which the "Wild Fire" symbol is displayed. Similarly, for each "B" symbol which has been converted into a "2×" multiplier symbol, the gaming system coverts "B" symbols bordering the recently converted "2×" multiplier symbol to the top, bottom, left and right into "2×" multiplier symbols. The gaming system continues this process until no "2×" multiplier symbols are bordered to the top, bottom, left or right by a "B" symbol. It should appreciated that in various embodiments, the gaming system converts all designated symbols (e.g., eight possible positions instead of four possible positions) surrounding a designated symbol (e.g., "Wild Fire" or "B") into a different symbol (e.g., "2×" symbol), instead of just those symbol positions to the top, bottom, left and right of the designated symbol, if the designated number of the evaluation triggering symbol are generated in the outcome of the wagering game. It should also be appreciated that in various other embodiments, symbols having any suitable predefined positional relationship to a respective designated symbol or newly converted symbol are converted into a different symbol (e.g., "2×" symbol).

Figure 4C:
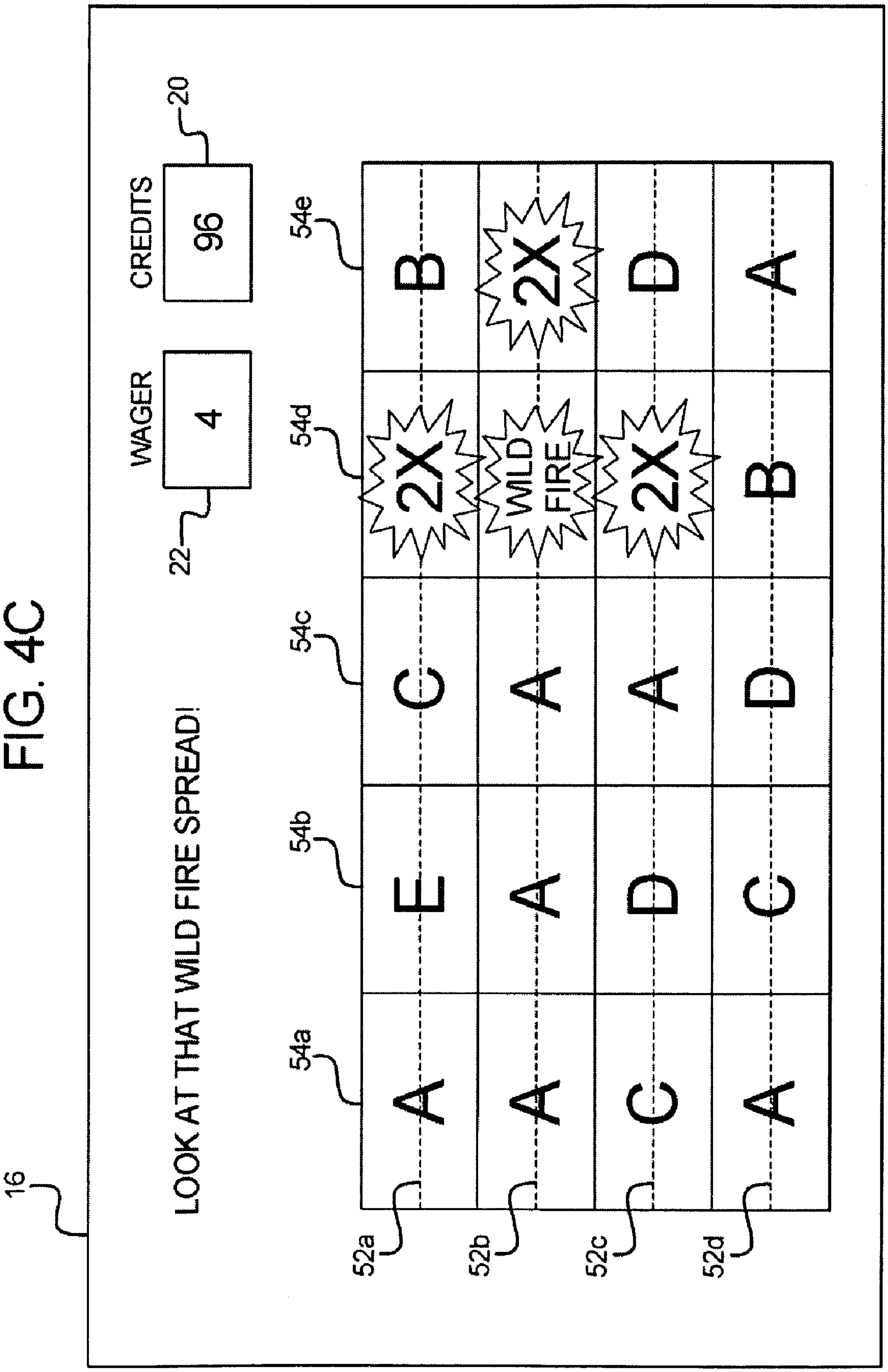

Specifically, referring to FIGS. 4B and 4C, the gaming system determines that the "Wild Fire" symbol at reel 54*d* borders two "B" symbols at reel 54*d* and one "B" symbol at reel 54*e*. Accordingly, the gaming system converts these three "B" symbols into "2×" multiplier symbols, as illustrated in FIG. 4D.

Figure 4D:
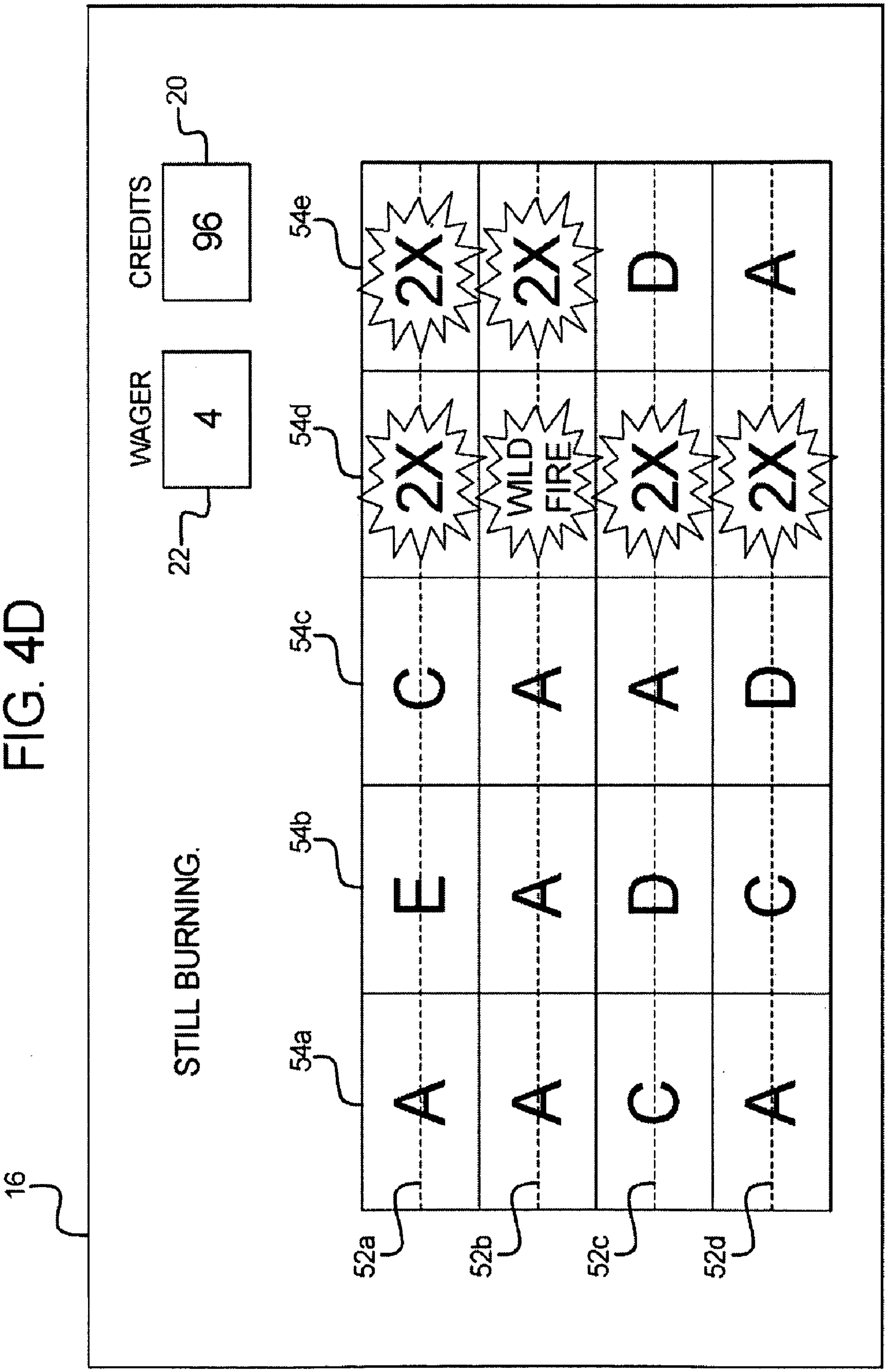

Referring to FIGS. 4C and 4D, the gaming system determines that each of the "2×" multiplier symbols at reel 54*d* which the gaming system converted are bordered by a "B" symbol. Accordingly, the gaming system converts these two "B" symbols into "2×" multiplier symbols, as illustrated in FIG. 4D.

The gaming system then determines if any of the "2×" multiplier symbols are bordered by a "B" symbol. The gaming system determines that no "2×" multiplier symbols are bordered by a "B" symbol. Thus, the conversion process is complete.

It should be appreciated that in various embodiments, the "2×" multiplier symbol, or other suitable symbol, does not replace certain bonus symbols under any circumstances.

Figure 4E:
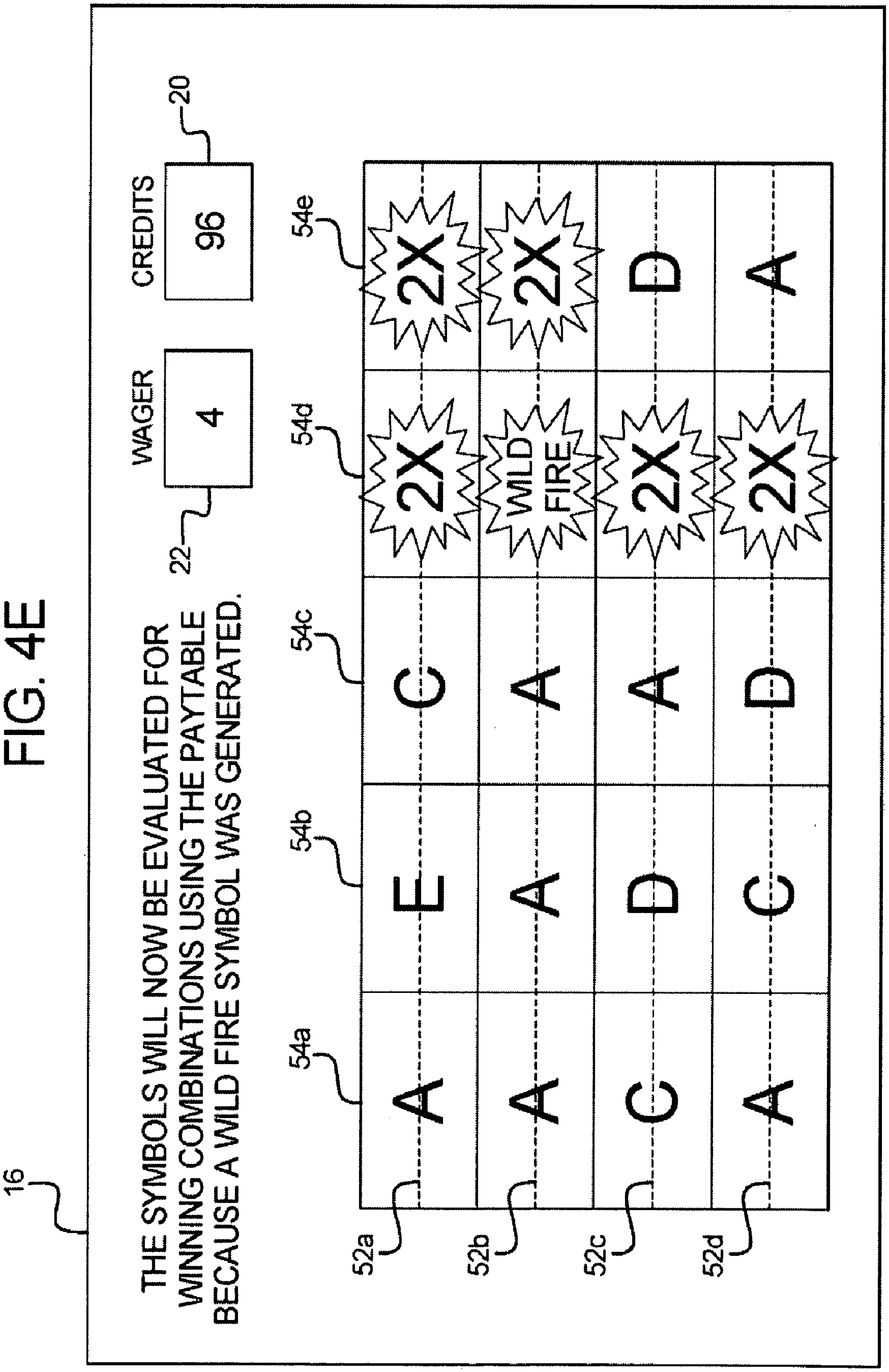

Referring to FIG. 4E, the gaming device display 16 indicates that because the "Wild Fire" multiplier symbol was displayed at reel 54*d*, the symbols will be evaluated for winning symbol combinations. In this embodiment, the designated number of the evaluation triggering symbol is one, as opposed to two. The wagering game of this embodiment still appeals to higher volatility players because due to the above symbol conversion process the gaming system performs if the evaluation triggering symbol ("Wild Fire") is generated, more than likely, more than one multiplier symbol will ultimately be used in the win evaluation sequence. In other words, in comparison to the embodiment illustrated in FIGS. 3A to 3H, the gaming system generating the "Wild Fire" symbol and subsequently performing the above symbol conversion process can have the same effect on an award as the gaming device initially generating at least two "2×" multiplier symbols.

Figure 4F:
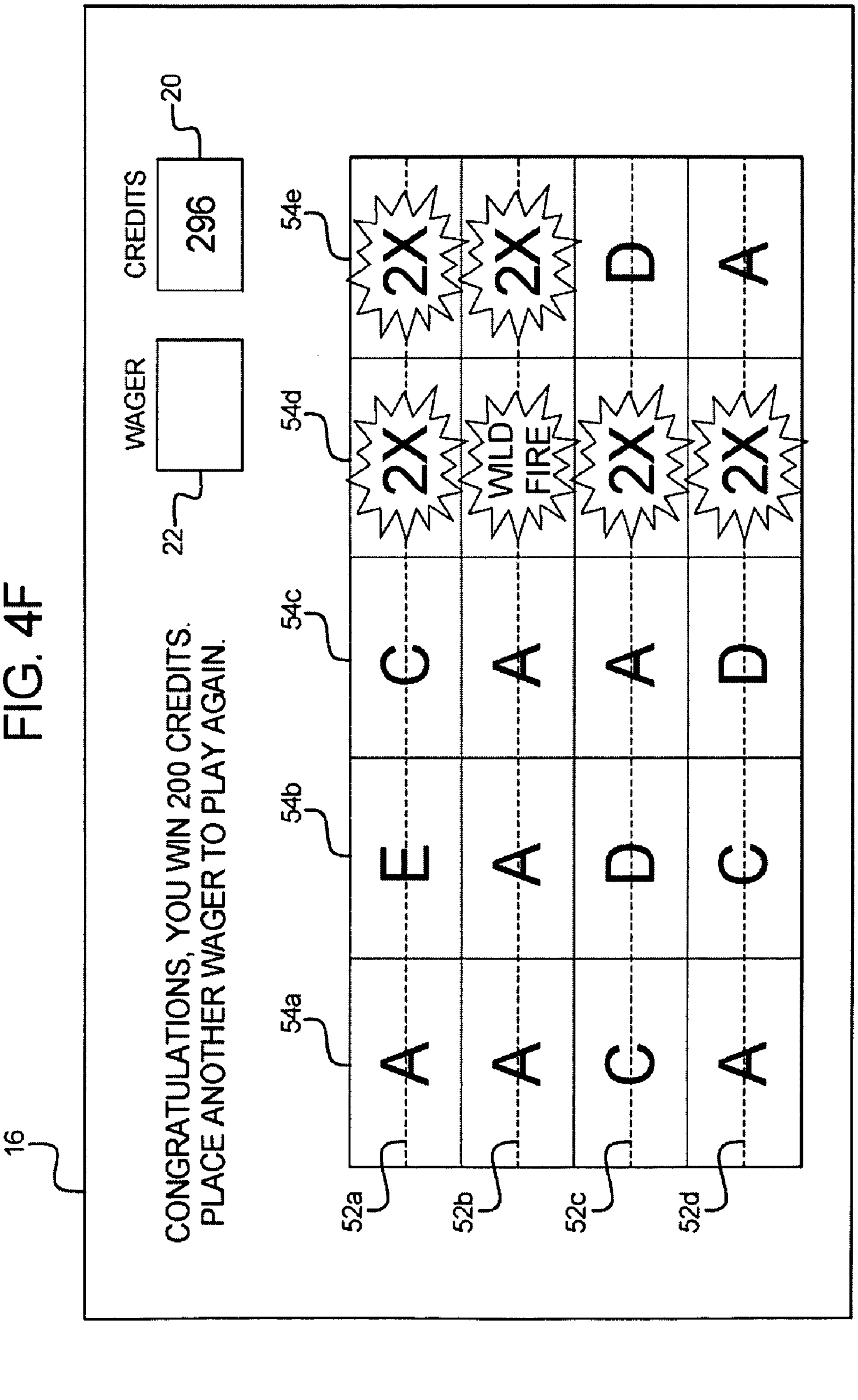

The gaming system determines that the symbol combination "A-A-A" on payline 52*b* in FIG. 4E is associated with an award of 50 credits, as illustrated in paytable 100 in FIG. 3A. The gaming system applies a multiplier of four resulting from the sum of the "2×" multiplier symbol at reel 54*e* and the multiplier of two associated with the "Wild Fire" symbol at reel 54*d* to the award of 50 credits, and multiplies the determined award of 200 credits by the one credit wagered on payline 52*b*. Accordingly, as illustrated in FIG. 4F; the gaming system displays an award of 200 credits and adds 200 credits to the credit display 20.

It should be appreciated that in various other embodiments, the "2×" multiplier symbol functions as both as a multiplier and as a wild symbol. Accordingly, in such embodiments, the award determined in FIG. 4E above would instead be an award of 400 credits, including a multiplier of four applied to the 100 credit award associated with the symbol combination "A-A-A-A-A" in paytable 100 of FIG. 3A.

It should be appreciated that in various other embodiments, the employed win evaluation sequence includes providing a player different ways to win as described in detail above. For example, in one embodiment, if a designated number of the evaluation triggering symbol are generated in an outcome of a play of the wagering game, rather than determining any awards to provide to the player by analyzing the symbols generated on any wagered upon paylines as described in the above embodiments, the gaming system determines any awards to provide the player based on the number of associated symbols which are generated at active symbol positions on the requisite number of adjacent reels (i.e., not on paylines passing through any displayed winning symbol combinations).

In various other embodiments, the gaming system uses a payline-based win evaluation to determine awards if the designated number of the evaluation triggering symbol are not generated and determines any awards to provide the player based on the number of associated symbols which are generated at active symbol positions on the requisite number of adjacent reels (i.e., not on paylines passing through any displayed winning symbol combinations) if the designated number of the evaluation triggering symbol are generated. In other words, based on the generation of a designated number of the evaluation triggering symbol in an outcome of the wagering game, the gaming system varies the way winning symbol combinations are determined. It should be appreciated that in various embodiments, the gaming system may use any suitable win evaluation method based on whether the designated number of the evaluation triggering symbol are generated (e.g., use a first win evaluation method if the designated number of the evaluation triggering symbol are not generated and use a second different win evaluation method if the designated number of the evaluation triggering symbol are generated).

In various other embodiments, the gaming system may make certain win evaluations regardless of whether or not the designated number of the evaluation triggering symbol are displayed, but makes certain win evaluations or subsets of evaluations only if the designated number of the evaluation triggering symbol are displayed. In one such embodiment, a plurality of gaming devices at one or more gaming sites are networked to the central server in a progressive configuration as discussed above. In such embodiments, the gaming system uses a win evaluation sequence which makes the player eligible for a progressive award if the designated number of evaluation triggering symbols are generated in the outcome of the wagering game.

In other such embodiments, different subsets of winning symbol combinations are evaluated based on whether the designated number of the evaluation triggering symbol are generated during the play of the game. For example, in one such embodiment, certain symbol combinations are always included in an evaluation for winning symbol combinations, but certain other symbol combinations are included in the evaluation for winning symbol combinations if the designated number of the evaluation triggering symbol are generated.

In various embodiments, the wagering game may evaluate a plurality of symbols generated for a play of the game for winning symbol combinations using a first paytable if a first number of evaluation triggering symbols are generated and a second paytable if a second number of evaluation triggering symbols are generated.

It should be appreciated that although in the embodiments illustrated herein the wagering game including the symbol driven win evaluation method is a base or primary game, in various other embodiments, the wagering game is a bonus or secondary game.

It should be appreciated that in certain embodiments, if the designated number of evaluation triggering symbols are not generated, the gaming system does not evaluate the symbols for winning symbol combinations no matter what symbols are displayed. In certain known gaming machines, certain symbols (e.g., cherry symbols) always result in an award each time generated. Such embodiments of the game disclosed herein would not evaluate even these types of symbols absent the occurrence of the designated number of the evaluation triggering symbol. In various other embodiments of the game disclosed herein, certain symbols could still be evaluated regardless of whether the designated number of evaluation triggering symbols are generated.

It should be appreciated that in various embodiments, the gaming system always performs certain win evaluations and certain win evaluations are added if the designated number of evaluation triggering symbols are generated.

It should be appreciated that in various embodiments, multiple different types of win evaluations take place for a play of the game. In certain such embodiments, symbols (or symbol positions) which are part of winning symbol combinations under multiple win evaluation types may function as a multiplier in calculating the award provided to the player for each of the multiple win evaluations (e.g., the win evaluations "run" into each other).

It should be appreciated that each of the foregoing examples are for illustrative purposes and that any of the features of any of the examples or other disclosure herein may be combined in any manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system including:

at least one input device;

at least one display device;

at least one processor; and at least one memory device storing a plurality of instructions which, when executed by the at least one processor, cause the at least one processor to operate with the at least one input device and the at least one display device for each play of a game, upon an input of a wager, to:

(a) randomly determine a plurality of symbols from a set of symbols, the set of symbols including a plurality of different symbols and including at least one evaluation triggering symbol;

(b) display the randomly determined symbols;

(c) determine if a designated number of the evaluation triggering symbol are displayed, said designated number being at least one;

(d) if the designated number of evaluation triggering symbols are not displayed, end the play of the game and provide no awards to the player;

(e) if the designated number of evaluation triggering symbols are displayed:

(i) for each evaluation triggering symbol:

(a) determine if the evaluation triggering symbol has a predefined positional relationship to at least one of a designated symbol, (b) if the evaluation triggering symbol has the predefined positional relationship to at least one of the designated symbol, convert the at least one designated symbol into a different symbol, (c) determine if any newly converted symbols have a predefined positional relationship to at least one of the designated symbol, (d) if any newly converted symbols have the predefined positional relationship to at least one of the designated symbol, convert the at least one designated symbol into the different symbol, and (e) repeat (c) and (d) until no newly converted symbols have the predefined positional relationship to at least one of the designated symbol;

(ii) determine if at least one of a plurality of predetermined winning symbol combinations of a paytable are displayed, and (iii) determine any awards associated with any displayed predetermined winning symbol combinations using the paytable; and (f) display and provide any determined awards to the player.

2. The gaming system of claim 1, wherein the predefined positional relationship includes the designated symbol being displayed at least one symbol position selected from the group consisting of: directly above, directly below, directly to the left and directly to the right of the symbol position of the evaluation triggering symbol or newly converted symbol.

3. The gaming system of claim 1, wherein the evaluation triggering symbol is a multiplier symbol.

4. The gaming system of claim 1, wherein the evaluation triggering symbol is part of at least one winning symbol combination.

5. The gaming system of claim 1, wherein the designated number of evaluation triggering symbols includes different evaluation triggering symbols.

6. The gaming system of claim 1, wherein the plurality of instructions, when executed by the at least one processor, cause the at least one processor to operate with the at least one input device and the at least one display device to determine if at least one of the plurality of predetermined winning symbol combinations of the paytable are to be displayed.

7. The gaming system of claim 1, wherein the plurality of instructions, when executed by the at least one processor, cause the at least one processor to operate with the at least one input device and the at least one display device to convert the at least one designated symbol into a symbol which is part of a predetermined winning symbol combination in the paytable.

8. The gaming system of claim 1, wherein the different symbol functions as a multiplier symbol.

9. The gaming system of claim 8, wherein the different symbol also functions as a wild symbol.

10. The gaming system of claim 1, wherein the designated symbol is selected from the group consisting of: (a) a major symbol and (b) a royal card symbol.

11. The gaming system of claim 1, wherein the designated symbol includes multiple different symbols.

12. The gaming system of claim 1, wherein the plurality of instructions, when executed by the at least one processor, cause the at least one processor to operate with the at least one input device and the at least one display device to if the designated number of the evaluation triggering symbols are generated, cause a player to be eligible for a progressive award.

13. The gaming system of claim 1, wherein the plurality of instructions, when executed by the at least one processor, cause the at least one processor to operate with the at least one input device and the at least one display device to determine if any predetermined winning symbol combinations are displayed by determining if any predetermined winning symbol combinations are generated on at least one wagered on payline.

14. The gaming system of claim 1, wherein the plurality of instructions, when executed by the at least one processor, cause the at least one processor to operate with the at least one input device and the at least one display device to determine if any predetermined winning symbol combinations are displayed by determining if a designated number of associated symbols are generated at active symbol positions at a designated number of adjacent reels.

15. A method of operating a gaming system, the method comprising:

causing at least one processor to operate with at least one display device and at least one input device to for each play of a game, upon an input of a wager:

(a) randomly determine a plurality of symbols from a set of symbols, the set of symbols including a plurality of different symbols and including at least one evaluation triggering symbol;

(b) display the randomly determined symbols;

(c) determine if a designated number of the evaluation triggering symbol are displayed, said designated number being at least one;

(d) if the designated number of evaluation triggering symbols are not displayed, end the play of the game and providing no awards to the player;

(e) if the designated number of evaluation triggering symbols are displayed:

(i) for each evaluation triggering symbol:

(a) determine if the evaluation triggering symbol has a predefined positional relationship to at least one of a designated symbol, (b) if the evaluation triggering symbol has a predefined positional relationship to at least one of the designated symbol, convert the at least one designated symbol into a different symbol, (c) determine if any newly converted symbols have the predefined positional relationship to at least one of the designated symbol, (d) if any newly converted symbols have the predefined positional relationship to at least one of the designated symbol, convert the at least one designated symbol into the different symbol, and (e) repeat (c) and (d) until no newly converted symbols have the predefined positional relationship to at least one of the designated symbol;

(ii) determine if at least one of a plurality of predetermined winning symbol combinations of a paytable are displayed, and (iii) determine any awards associated with any displayed predetermined winning symbol combinations using the paytable; and causing the at least one processor to operate with the at least one display device to:

(f) displaying display and providing provide any determined awards to the player.

16. The method of claim 15, wherein the predefined positional relationship includes the designated symbol being displayed at least one symbol position selected from the group consisting of: directly above, directly below, directly to the left and directly to the right of the symbol position of the evaluation triggering symbol or newly converted symbol.

17. The method of claim 15, which includes causing the evaluation triggering symbol to be a multiplier symbol.

18. The method of claim 15, which includes causing the evaluation triggering symbol to be part of at least one winning symbol combination.

19. The method of claim 15, which includes causing the designated number of evaluation triggering symbols to include different evaluation triggering symbols.

20. The method of claim 15, which includes determining if at least one of the plurality of predetermined winning symbol combinations of the paytable are to be displayed.

21. The method of claim 15, which includes converting the at least one designated symbol into a symbol which is part of a predetermined winning symbol combination in the paytable.

22. A non-transitory memory device which store a plurality of instructions which, when executed by at least one processor, cause the at least one processor to operate with at least one input device and at least one display device for each play of a game, upon an input of a wager, to:

(a) randomly determine a plurality of symbols from a set of symbols, the set of symbols including a plurality of different symbols and including at least one evaluation triggering symbol;
(b) display the randomly determined symbols;
(c) determine if a designated number of the evaluation triggering symbol are displayed, said designated number being at least one;
(d) if the designated number of evaluation triggering symbols are not displayed, end the play of the game and provide no awards to the player;
(e) if the designated number of evaluation triggering symbols are displayed:
 (i) for each evaluation triggering symbol:
  (a) determine if the evaluation triggering symbol has a predefined positional relationship to at least one of a designated symbol,
  (b) if the evaluation triggering symbol has the predefined positional relationship to at least one of the designated symbol, convert the at least one designated symbol into a different symbol,
  (c) determine if any newly converted symbols have a predefined positional relationship to at least one of the designated symbol,
  (d) if any newly converted symbols have the predefined positional relationship to at least one of the designated symbol, convert the at least one designated symbol into the different symbol, and
  (e) repeat (c) and (d) until no newly converted symbols have the predefined positional relationship to at least one of the designated symbol;
 (ii) determine if at least one of a plurality of predetermined winning symbol combinations of a paytable are displayed, and
 (iii) determine any awards associated with any displayed predetermined winning symbol combinations using the paytable; and
(f) display and provide any determined awards to the player.

23. The memory device of claim 22, wherein the evaluation triggering symbol is a multiplier symbol.

24. The memory device of claim 22, wherein the evaluation triggering symbol is part of at east one winning symbol combination.

25. The memory device of claim 22, wherein the designated number of evaluation triggering symbols includes different evaluation triggering symbols.

26. The memory device of claim 22, wherein the plurality of instructions, when executed by the at least one processor, cause the at least one processor to operate with the at least one input device and the at least one display device to determine if at least one of the plurality of predetermined winning symbol combinations of the paytable are to be displayed.

27. The memory device of claim 22, wherein the plurality of instructions, when executed by the at least one processor, cause the at least one processor to operate with the at least one input device and the at least one display device to convert the at least one designated symbol into a symbol which is part of a predetermined winning symbol combination in the paytable.

28. The memory device of claim 22, wherein the different symbol functions as a multiplier symbol.

29. The memory device of claim 28, wherein the different symbol also functions as a wild symbol.

30. The method of claim 15, which includes causing the different symbol to function as a multiplier symbol.

31. The method of claim 30, which includes causing the different symbol to function as a wild symbol.

32. The method of claim 15, wherein the designated symbol is selected from the group consisting of: (a) a major symbol and (b) a royal card symbol.

33. The method of claim 15, which includes causing the designated symbol to include multiple different symbols.

34. The method of claim 15, which includes if the designated number of the evaluation triggering symbols are generated, causing a player to be eligible for a progressive award.

35. The method of claim 15, which includes determining if any predetermined winning symbol combinations are displayed by determining if any predetermined winning symbol combinations are generated on at least one wagered on payline.

36. The method of claim 15, which includes determining if any predetermined winning symbol combinations are displayed by determining if a designated number of associated symbols are generated at active symbol positions at a designated number of adjacent reels.

37. The method of claim 15, which is provided through a data network.

38. The method of claim 15, wherein the data network is an internet.

39. The memory device of claim 22, wherein the predefined positional relationship includes the designated symbol being displayed at least one symbol position selected from the group consisting of: directly above, directly below, directly to the left and directly to the right of the symbol position of the evaluation triggering symbol or newly converted symbol.

40. The memory device of claim 22, wherein the designated symbol is selected from the group consisting of: (a) a major symbol and (b) a royal card symbol.

41. The memory device of claim 22, wherein the designated symbol includes multiple different symbols.

42. The memory device of claim 22, wherein the plurality of instructions, when executed by the at least one processor, cause the at least one processor to operate with the at least one input device and the at least one display device to if the designated number of the evaluation triggering symbols are generated, cause a player to be eligible for a progressive award.

43. The memory device of claim 22, wherein the plurality of instructions, when executed by the at least one processor, cause the at least one processor to operate with the at least one input device and the at least one display device to determine if any predetermined winning symbol combinations are displayed by determining if any predetermined winning symbol combinations are generated on at least one wagered on payline.

44. The memory device of claim 22, wherein the plurality of instructions, when executed by the at least one processor, cause the at least one processor to operate with the at least one input device and the at least one display device to determine if any predetermined winning symbol combinations are displayed by determining if a designated number of associated symbols are generated at active symbol positions at a designated number of adjacent reels.

* * * * *

UNITED STATES PATENT AND TRADEMARK OFFICE

CERTIFICATE OF CORRECTION

PATENT NO. : 8,172,665 B2
APPLICATION NO. : 12/269229
DATED : May 8, 2012
INVENTOR(S) : Benjamin C. Hoffman et al.

It is certified that error appears in the above-identified patent and that said Letters Patent is hereby corrected as shown below:

In Claim 1, Column 24, Line 48, between “of” and “evaluation” insert --the--.
In Claim 1, Column 24, Line 49, replace “symbols” with --symbol--.
In Claim 1, Column 24, Line 50, replace “the” with --a--.
In Claim 1, Column 24, Line 51, between “of” and “evaluation” insert --the--.
In Claim 1, Column 24, Line 52, replace “symbols” with --symbol--.
In Claim 1, Column 24, Line 62, replace “a” with --the--.
In Claim 2, Column 25, Line 16, replace the third instance of “the” with --a--.
In Claim 5, Column 25, Line 24, between “of” and “evaluation” insert --the-- and replace “symbols” with --symbol--.
In Claim 12, Column 25, Line 52, replace “symbols” with --symbol--.
In Claim 12, Column 25, Line 53, replace the first instance of “a” with --the--.
In Claim 15, Column 26, Line 18, between “of” and “evaluation” insert --the--.
In Claim 15, Column 26, Line 19, replace “symbols” with --symbol--.
In Claim 15, Column 26, Line 20, replace “providing” with --provide-- and “the” with --a--.
In Claim 15, Column 26, Line 21, between “of” and “evaluation” insert --the--.
In Claim 15, Column 26, Line 22, replace “symbols” with --symbol--.
In Claim 15, Column 26, Line 27, replace “a” with --the--.
In Claim 15, Column 26, Line 49, delete “displaying” and “providing”.
In Claim 16, Column 26, Line 55, replace the second instance of “the” with --a--.
In Claim 19, Column 26, Line 63, between “of” and “evaluation” insert --the-- and replace “symbols” with --symbol--.
In Claim 22, Column 27, Line 5, replace “store” with --stores--.
In Claim 22, Column 27, Line 17, between “of” and “evaluation” insert --the--.
In Claim 22, Column 27, Lines 17 to 18, replace “symbols” with --symbol--.
In Claim 22, Column 27, Line 19, replace “the” with --a--.
In Claim 22, Column 27, Line 20, between “of” and “evaluation” insert --the--.
In Claim 22, Column 27, Lines 20 to 21, replace “symbols” with --symbol--.
In Claim 22, Column 27, at about Line 30, replace “have a” with --have the--.
In Claim 24, Column 27, at about Line 50, replace “east” with --least--.

Signed and Sealed this
Second Day of October, 2012

David J. Kappos

David J. Kappos
*Director of the United States Patent and Trademark Office*

In Claim 25, Column 27, at about Line 52, between “of” and “evaluation” insert --the-- and replace “symbols” with --symbol--.
In Claim 34, Column 28, Line 15, replace “symbols” with --symbol--.
In Claim 34, Column 28, Line 16, replace the first instance of “a” with --the--.
In Claim 39, Column 28, Line 34, replace “right of the” with --right of a--.
In Claim 42, Column 28, Line 46, replace “symbols” with --symbol--.
In Claim 42, Column 28, Line 47, replace the first instance of “a” with --the--.